(12) United States Patent
Kadambe et al.

(10) Patent No.: US 9,322,907 B1
(45) Date of Patent: Apr. 26, 2016

(54) BEHAVIOR BASED FRIEND FOE NEUTRAL DETERMINATION METHOD

(75) Inventors: Shubha L. Kadambe, Cedar Rapids, IA (US); Benjamin J. Haan, Marion, IA (US); Marco Mattos Carvalho, Satellite Beach, FL (US); Carlos Arturo Perez Monsalve, Tampa, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 622 days.

(21) Appl. No.: 13/568,772

(22) Filed: Aug. 7, 2012

(51) Int. Cl.
*G06K 19/00* (2006.01)
*G01S 13/78* (2006.01)
*G01S 7/04* (2006.01)

(52) U.S. Cl.
CPC .. *G01S 13/78* (2013.01); *G01S 7/04* (2013.01)

(58) Field of Classification Search
CPC ........... G06F 19/00; G06F 17/00; G06G 7/80; G06K 19/00
USPC .................................. 235/487, 375, 400–417
See application file for complete search history.

(56) References Cited

U.S. PATENT DOCUMENTS

| | | | | |
|---|---|---|---|---|
| 8,233,412 B1* | 7/2012 | Abbey et al. | ................... | 370/276 |
| 8,805,292 B1* | 8/2014 | Carbajal | ..................... | 455/67.11 |
| 8,904,522 B1* | 12/2014 | Kambhampati et al. | ........ | 726/22 |
| 2003/0176806 A1* | 9/2003 | Pineda et al. | ................. | 600/544 |
| 2004/0153866 A1* | 8/2004 | Guimbellot et al. | ............ | 714/47 |
| 2005/0248480 A1* | 11/2005 | Butler et al. | .................... | 342/45 |
| 2008/0008354 A1* | 1/2008 | Milbert | ..................... | F41G 3/02 382/103 |
| 2008/0293353 A1* | 11/2008 | Mody et al. | ........................ | 455/1 |
| 2009/0195401 A1* | 8/2009 | Maroney | ............ | G06K 9/00771 340/686.6 |
| 2010/0008515 A1* | 1/2010 | Fulton | .................... | H04R 3/005 381/92 |
| 2010/0250497 A1* | 9/2010 | Redlich et al. | ................ | 707/661 |
| 2011/0309143 A1* | 12/2011 | Wood | ..................... | G09B 9/003 235/400 |
| 2012/0117114 A1* | 5/2012 | Goranson | ................ | G06N 5/00 707/776 |

* cited by examiner

*Primary Examiner* — Edwyn Labaze
(74) *Attorney, Agent, or Firm* — Angel N. Gerdzhikow; Donna P. Suchy; Daniel M. Barbieri

(57) ABSTRACT

A method for behavior based Friend/Foe/Neutral determination is disclosed. The method receives RF communications from a plurality of perceived entities and records a plurality of first level characteristics of the RF communications. The method determines, from an analysis of the first level characteristics a plurality of second level characteristics of the RF communications. From these second level characteristics, the method determines transmission patterns of the entities over time which lead to an ultimate classification of the perceived entity as a Friend/Foe/Neutral based on the patterns.

20 Claims, 19 Drawing Sheets

| Modulation type | Accuracy |
|---|---|
| 4ASK | 195/200=98% |
| PSK(BPSK,QPSK,8PSK) | 578/600=96.3% |
| QAM(16,64,256) | 576/600=95.1% |
| BFSK | 200/200=100% |
| 4FSK | 200/200=100% |
| GMSK | 200/200=100% |
| AM | 200/200=100% |
| FM | 86/94=91% |
| WCDMA | 67/109=61% |

| Device Name | Id accuracy in % |
|---|---|
| Motorol-M2 | 100 |
| Motorcl-M5 | 94.33 |
| Motorcl-M6 | 61.33 |
| Cobra-U1 | 96 |
| Cobra-U2 | 100 |
| Cobra-U3 | 100 |
| Cobra-U4 | 81.33 |
| Cobra-U5 | 95.66 |
| Cobra-U6 | 100 |

| Device Name | Id accuracy in % |
|---|---|
| iPhoneA | 92.31 |
| iPhoneA | 100 |
| iPhoneA | 100 |
| iPhoneA | 94.74 |
| iPhoneA | 97.44 |
| Razr | 100 |
| Blackberry | 100 |

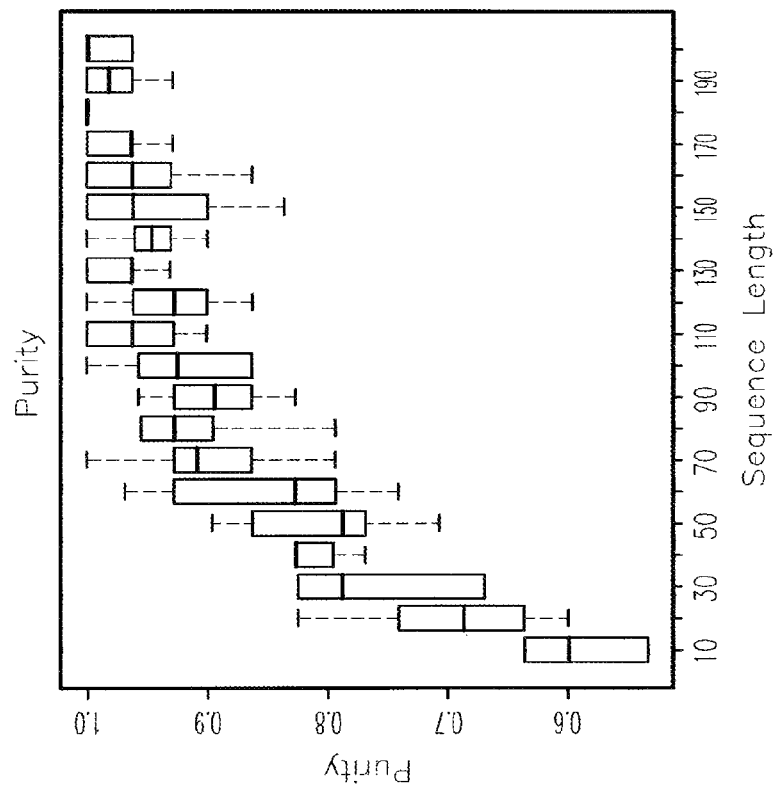
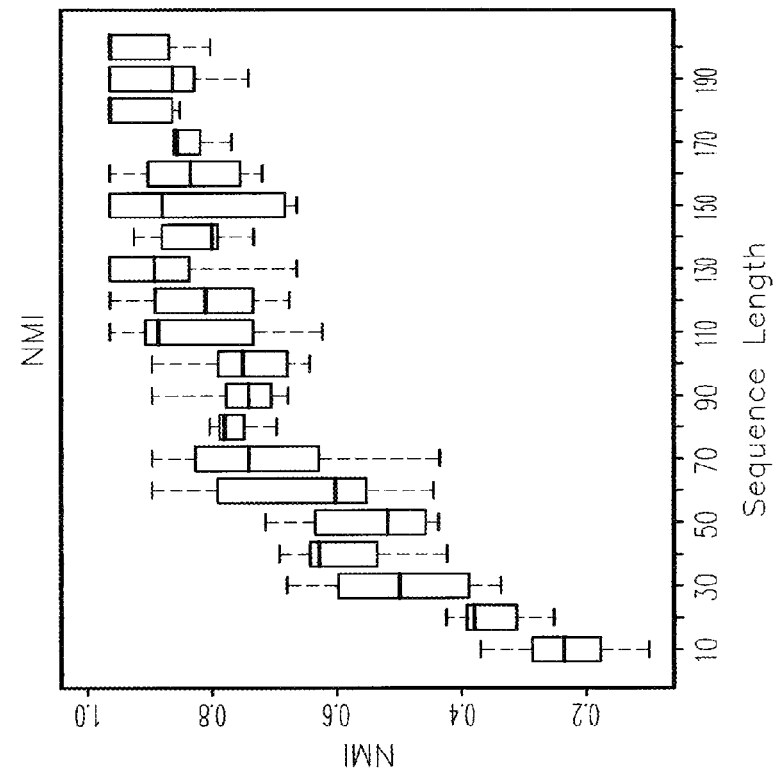
FIG. 9A
FIG. 9B

US 9,322,907 B1

BEHAVIOR BASED FRIEND FOE NEUTRAL DETERMINATION METHOD

FIELD OF THE INVENTION

The present invention relates generally to determining an identification of a perceived entity. More particularly, embodiments of the present invention relate to a computerized method for reception of radio frequency (RF) communications and, using modeling of behaviors combined with multi-layer dynamic Hidden Markov Models, determination of a classification of the perceived entity as a Friend, a Foe, or a Neutral.

BACKGROUND OF THE INVENTION

In today's asymmetrical military operations warfighters may daily face new threats which may place them in harm's way. Identification and further classification of these threats may present a valuable tool to enable a warfighter to more successfully resolve a threatening situation.

Current solutions may be based on a priori fixed policies. Unfortunately, such solutions may be static in nature and unable to handle previously unknown situations. In a wartime environment, there may be situations where the dynamic nature of the battleground lends itself to a constantly evolving situation. A static solution may lag what is currently present and required for the warfighter to evaluate. Currently, there are no behavior based friend/foe/neutral determiners which may provide the needed time critical flexibility.

Previous approaches attempting to solve an identification problem have been developed for RF Electronic warfare (EW). Some approaches may include electronic situation awareness (ESA), Electronic Protection (EP) and Electronic attack (EA). Most of these systems may operate from a stand-off distance and are statically trained for certain types of threats (i.e. RF signals) prior to deployment. These systems may not be able to automatically adapt to new and previously unknown threats that may arise in the monitored areas. When these static systems encounter a new threat, data for the new threat is collected and the systems may require off-battlefield maintenance for retraining. Similarly, the collected threat data may be sent to an analyst to determine what techniques may be needed to counter the threat. This process may be considerably time consuming, taking from a day to several months for analysis and re-deployment. Within this retraining period, adversaries may have introduced new threats against which the warfighter may be required to overcome. Furthermore, EA systems historically used for countering threats may generally create a "dead zone" of high energy noise which may inhibit desirable communication.

Identification and classification of a perceived entity based on received RF communications may be beneficial to a wide variety of applications such as Electronic Intelligence (ELINT), Communications Intelligence (COMINT) and Electronic warfare (EW).

Therefore, a novel approach may be employed to receive RF energy from a perceived entity and accurately identify and classify the entity based on a modeling analysis of the RF energy.

SUMMARY OF THE INVENTION

Accordingly, a preferred embodiment of the present invention is directed to a method for determining an identification of a perceived entity, the method comprising: receiving a first radio frequency (RF) communication from the perceived entity, identifying at least one first level characteristic associated with the first RF communication, monitoring the perceived entity for additional RF communications, receiving additional RF communications from the perceived entity, identifying at least one first level characteristic associated with the additional RF communications, storing the at least one first level characteristic associated with the first RF communication and the at least one first level characteristic associated with the additional RF communications, identifying and storing at least one second level characteristic associated with the first RF communication and the additional RF communications, the at least one second level characteristic derived from an analysis of the at least one first level characteristic, analyzing each of the at least one second level characteristics to determine a pattern, determining, based on the pattern, an identification of the perceived entity, displaying the identification to a user on a display.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIGS. 9a and 9b are box-plots of normalized mutual information (NMI) and purity representative of HMM algorithm testing results applicable to a preferred embodiment of the present invention.

DETAILED DESCRIPTION OF THE INVENTION

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Introduction

Preferred methods disclosed herein may comprise a behavior based highly dynamic Friend/Foe/Neutral (FFN) classifier system that may function to accurately associate perceived RF nodes with certain behaviors. The methods may then associate certain behaviors as friendly behaviors, foe behaviors, or neutral behaviors.

The present invention may be associated as an integral portion of a Cognitive Networked Electronic Warfare (CNEW) having the following capabilities:
a. Multiple known/unknown RF signal detection, classification and geolocation with learning,
b. Friend/Foe/Neutral determination a impact of foe to the friendly network,
c. Low power networked optimum jamming with minimum collateral damage,
d. Quick response time for unknown threats,
e. Cognitive Spectrum management,
f. Specific emitter identification of RF radios and handsets.

One goal of the current invention may comprise a shift from a manual, labor-intensive, lab-based development approach to an adaptive, in-the-field systems based approach. In addition, an integrated small form factor hardware device may be specially configured to implement CNEW systems on a tactical radio. This hardware may possess multiple functionalities including communications and EW. In using a small form factor device, the instant invention may also address issues such as size, weight, power and cost (SWaP-C) limitations of current federated EW systems.

One unique element of the disclosed solution may include modeling of behaviors using well-known multi-layer dynamic Hidden Markov Models (HMM). An additional element may include learning the structure of the model (i.e., the number of nodes, transition from one node to the other and the transition probabilities) on-line. An additional unique element may include clustering the models. An additional key element may include evaluation of the models using at least two measures—purity and normalized mutual information.

Figure 1:
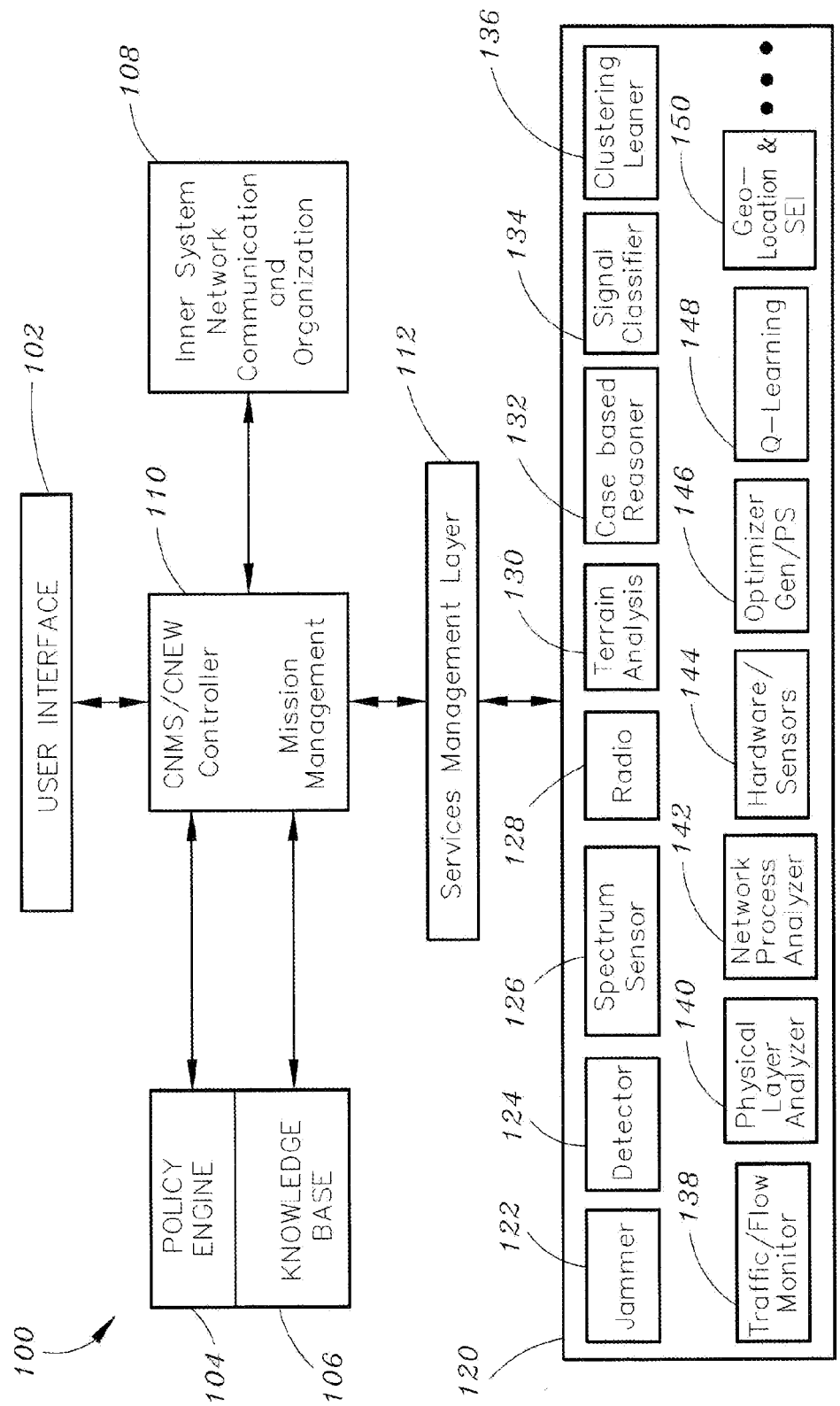
FIG. 1 is a block diagram of an overall Cognitive Networked Electronic Warfare (CNEW) system and method representative of a preferred embodiment of the present invention.

Referring to FIG. 1, a block diagram of an overall Cognitive Networked Electronic Warfare (CNEW) system and method representative of a preferred embodiment of the present invention is shown. Method 100 may comprise an overall system controlled by CNEW controller 110. Controller 110 may send and receive data from user interface 102, policy engine module 104, knowledge base module 106, inner system network communication and organization module 108, and services management layer 112.

The CNEW operators 120 may communicate with controller 110 via services management layer 112. CNEW operators may comprise jammer 122, detector 124, spectrum sensor 126, radio 128, terrain analysis 130, case based reasoner 132, signal classifier 134, and clustering learner 136. Further CNEW operators may comprise traffic/flow monitor 138, physical layer analyzer 140, network process analyzer 142, hardware/sensors 144, optimizer 146, Q-learning module 148, and geo-location a Specific Emitter Identification (SEI) module 150.

CNEW systems may include a situational awareness subsystem. The situational awareness subsystem may use CNEW operators 120 to detect, classify (including the specific emitter identification) and geo-locate all the RF emitters present in a surveillance area. Additional functionality may include further classification of all the detected emitters as Friend, Foe or Neutral (FFN). Such a FFN classification may assist friendly forces in attacking only foes and continuous monitoring of all perceived entities to determine whether a friend or a neutral will become foe. This classification capability may assist friendly forces in electronically attacking only specific sets of threats. The present invention addresses this need by disclosing a system that may group detected emitters as friends, foes or neutrals based on the RF behaviors.

Figure 2:
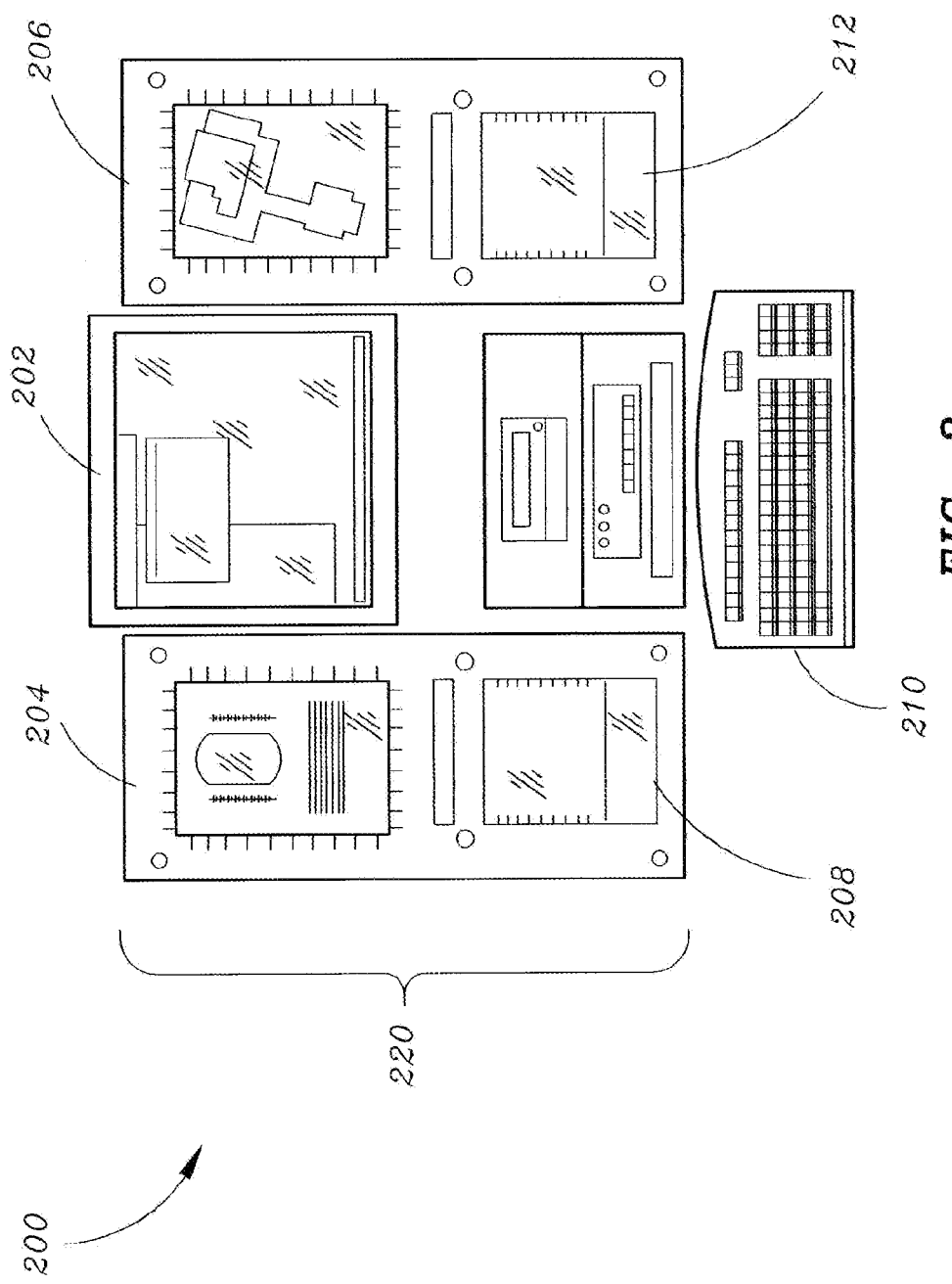
FIG. 2 is a diagram of a user interface workstation configured to operate with a preferred embodiment of the present invention.

Referring to FIG. 2, a diagram of a user interface workstation configured to operate with a preferred embodiment of the present invention is shown. User interface 102 may comprise a plurality of devices offering awareness and connectivity to an operator. A workstation 220 may comprise displays 204, 202, and 206. Radio 212 may enable an operator to communicate with various entities as desired. Keyboard 210 may allow an operator input to the system. Display 208 may enable a user access to multifunction screens to direct the methods of the present invention.

Figure 3:
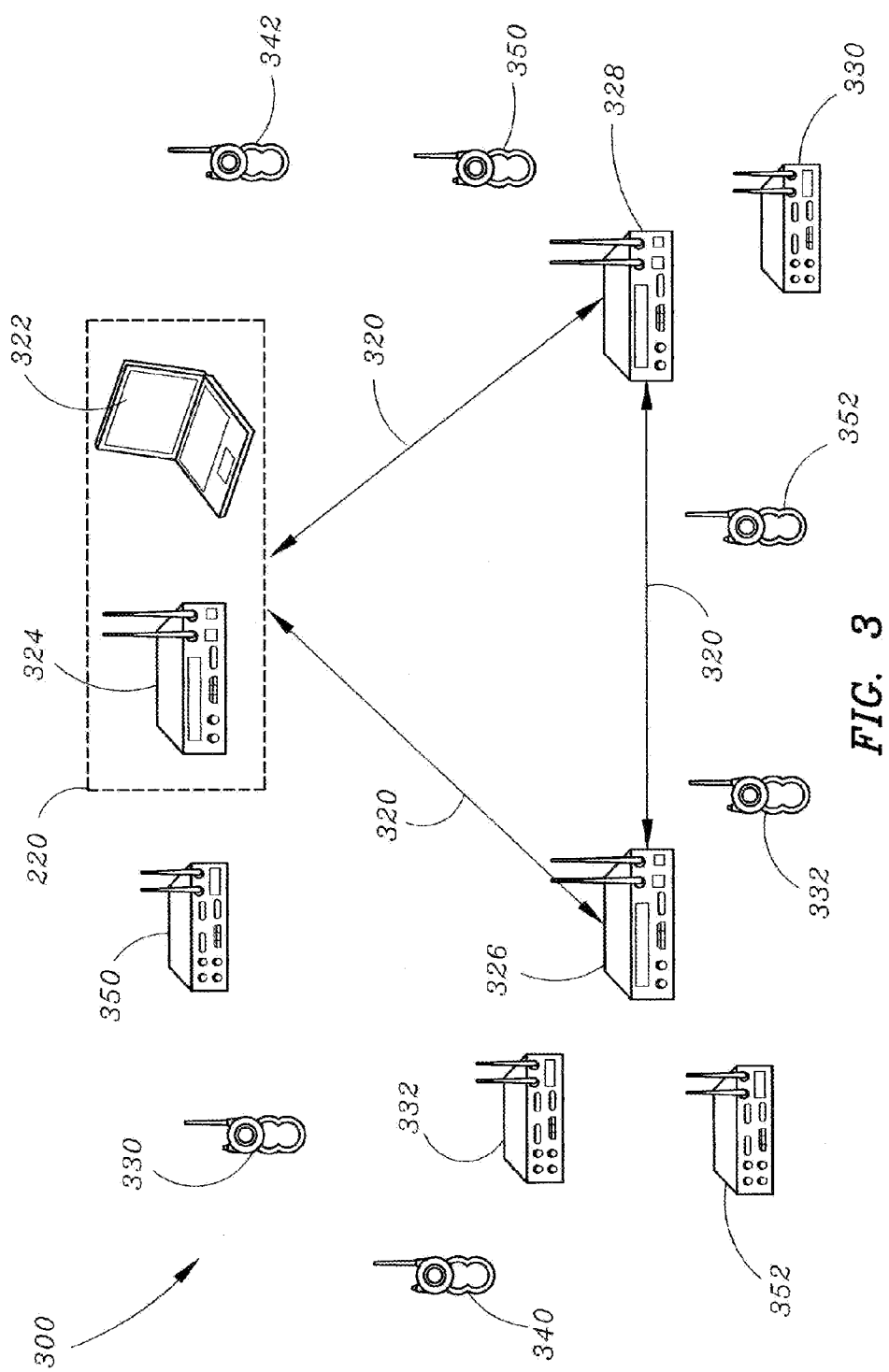
FIG. 3 is a diagram of one implementation of a CNEW system in accordance with a preferred embodiment of the present invention.

Referring to FIG. 3, a diagram of one implementation of a CNEW system in accordance with a preferred embodiment of the present invention is shown. Implementation 300 may comprise a plurality of transmitters and receivers monitored by nodes associated with CNEW systems. Friendly transmitter 330 and friendly receiver 332 may send and receive communications from friendly entities. Enemy transmitter 350 and enemy receiver 352 may send and receive communications from enemy entities. Similarly, neutral transmitter 340 and neutral receiver 342 may send and receive communications from neutral entities. The workstation 220 further may include reception node 324 and processor 322. Additional reception nodes 326 and 328 may be in data communication 320 with reception node 324 enabling more distant surveillance of desired entities. It is contemplated herein transmitters and receivers may comprise all RF emitters and receivers. For example, an enemy transmitter may include a high power active surveillance or target tracking radar system as well as a lower power cellular transceiver and small helmet mounted transceiver.

Figure 4A:
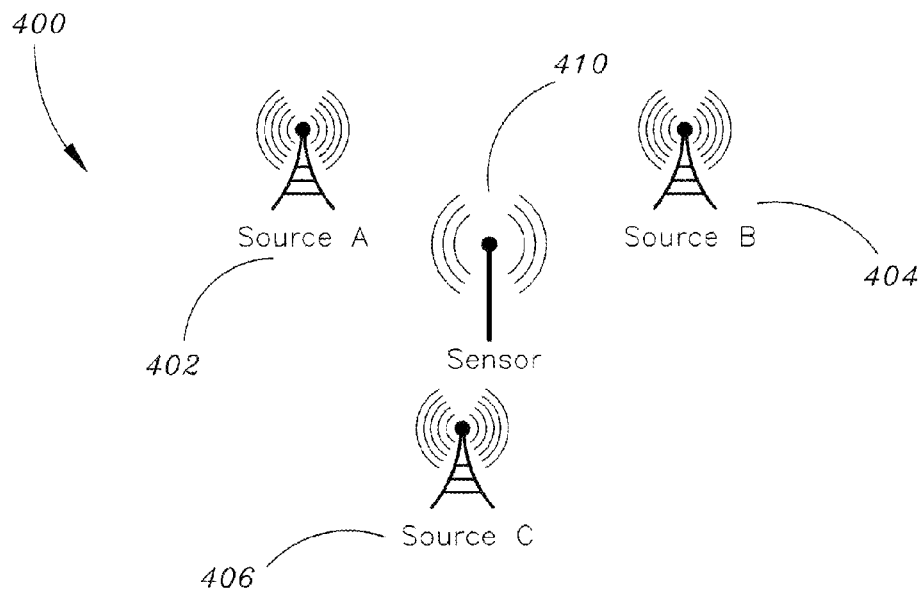
FIG. 4a is a diagram representative of source and sensor location in accordance with a preferred embodiment of the present invention.

Referring to FIG. 4a, a diagram representative of source and sensor location in accordance with a preferred embodiment of the present invention is shown. Sensor 410 may receive and process signals from a plurality of sources 402, 404, 406. In order to attempt to classify RF sources 402, 404, 406, method 100 may first attempt to cluster the sources.

Friend-Foe-Neutral classification may be seen as a clustering exercise, in which one may include partitioning sets of entities into smaller sets which exhibit similar characteristics. Those resulting smaller sets may then be classified as friends, foes, or neutral based on external knowledge. A first assumption may be that entities of the same type behave in a similar manner. A second assumption may apply to entities desiring to hide their true identity by behaving similarly to the entities that are trying to impersonate. Those impersonators may, at some point, show similar behavior to that of a certain class, allowing discovery and classification of the true identity of the entity.

Use of Markov models to model the behavior of such entities may successfully accomplish this clustering exercise. In a worst case scenario, each entity may exhibit completely different behavior, in which case a model may be constructed for each entity with a lower success of successful classification. However, in many cases, entities may show similar behavior. In those cases of similar behavior, models for those entities may be combined to create a cluster. Using a combination of learning and inference algorithms for Markov models, the method may cluster the entities that have sequences of observations that may most likely resemble the same model.

Method 100 may use Hidden Markov models and Markov chains combined with clustering algorithms to successfully model the behavior of, and thus cluster and ultimately classify as Friend, Foe, or Neutral, the perceived entities.

Hidden Markov Models

The dynamic state of each type of entity may be modeled by a hidden Markov model (HMM). A Markov model may be well-known in the art of modeling and may be defined herein as a finite state model in which the stochastic transitions between states depend only on the current state of the system. A next state of the system is conditionally independent of the previous states given the current state of the system. In a HMM, the states may not be directly observable. Instead, a set of unobserved, hidden states are associated with a set of observations, each of which may be probabilistically generated by each of the hidden states.

This model may be uniquely appropriate for modeling perceived entities herein because the precise current state of the entities is in most cases unknown or hidden. This may be particularly true for entities exhibiting foe and neutral behaviors. Method 100 may retain capability to gather information from sensors and other sources from which the method may infer the probable states that generated such observations. Method 100 may then relate these observations to each true hidden state via a probabilistic function, and the next state is solely determined by the current observations and the current state of the system.

A HMM may consist of a set of states S, a set of observations O, and the following probability distributions:

State Transitions: $Pr(s_j|s_i)$, for all states $s_i, s_j \in S$

Observations: $Pr(o_j|s_i)$, for all states $s_i \in S$ and observations $o_j \in O$.

Initial states: $Pr(x_0=s_i)$, for all states $s_i \in S$.

Given a sequence of states $(x_0, x_1, \ldots)$, where $x_t \in S$, and a corresponding sequence of observations $(y_0, y_1, \ldots)$, where $y_t \in O$, the observation at step t is dependent only on the state at step t:

$$Pr(y_t|x_0,x_1,y_0,\ldots,y_{t-1})=Pr(y_t|x_t).$$

And the state of the system at step t+1, is only dependent on the state at step t:

$$Pr(x_{t+1}|x_0,\ldots,x_t)=Pr(x_{t+1}|x_t).$$

Probability Estimation

Method 100 may further compute the probability of a sequence of observations given the HMM. A well-known algorithm known as Forward-Backward algorithm may allow efficient estimation of these probabilities. An original version of this algorithm, however, may suffer from underflow problems when computing the probability of very long sequences, because the probability of longer sequences is usually smaller. To overcome such an underflowing problem, method 100 may use a hybrid version of the algorithm incorporating a scaling method.

Parameter Learning

Given an HMM and a list of sequences of observations, method 100 may estimate the parameters of the HMM (initial state probabilities, transition probabilities and observation probabilities), by expectation maximization (EM) so that the resulting HMM better fits the observed data. A well-known algorithm to accomplish this task may be known as the Baum-Welch algorithm. The Baum-Welch algorithm is an Expectation-Maximization algorithm and it may incorporate the Forward-Backward algorithm.

Method 100 may incorporate a unique feature of this algorithm, specifically incremental parameter estimation. The method may update the parameter values on each iteration of the algorithm to better fit the current observations. The algorithm may keep memory of previously learned sequences, but it may also gradually forget the learned sequences as more new sequences are given to relearn the parameters.

Method 100 may receive as input, the initial parameter values, a list of sequences of observations, and a stop condition, which is traditionally a maximum number of iterations. On each iteration, the algorithm may use the Forward-Backward algorithm to adjust the parameters given all the sequences. So, on each iteration, there may be a new HMM that used in the following iteration.

To ensure method 100 may find a global maximum, the method may randomly select the initial parameters. This random initialization, followed by running the Baum-Welch algorithm multiple times with different initial parameter values, may allow the method to choose the model (i.e., global maximum) that best fits the data.

Structure Learning

Method 100 may provide an initial structure of the HMM to incorporate the parameter learning algorithm for HMMs. The parameter learning algorithm may vanish transitions that are not part of the real structure, but it may not be allowed to add or remove states from the HMM structure. So, as the number of states may not be algorithmically changed, one source the method may use for the initial structure may include input from expert knowledge.

In many cases, the number of states may not be expertly estimated. Given that the internal states in some cases are truly hidden, even to the experts, it is desirable to have a procedure that finds the best number of states. Method 100 may use a simple approach that searches incrementally for the best number of states until the probability of the training sequences doesn't increase.

Clustering

Figure 4B:
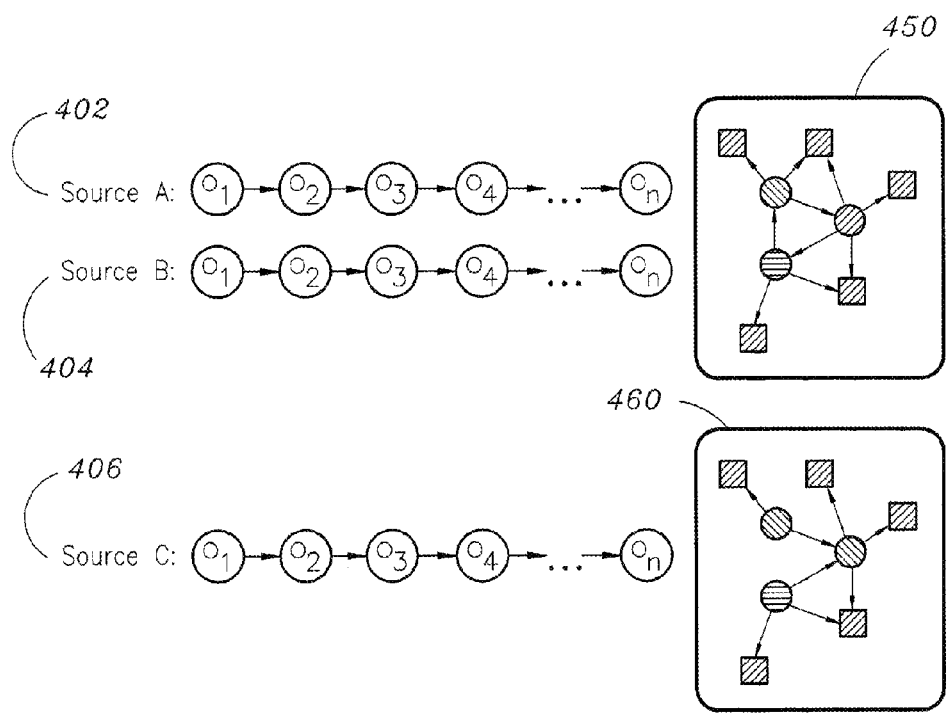
FIG. 4b is a diagram representative of HMM clustering models and sequences used to retrain models in accordance with a preferred embodiment of the present invention.

Referring to FIG. 4b, a diagram representative of HMM clustering models and sequences used to retrain models in accordance with a preferred embodiment of the present invention is disclosed. Sources 402, 404, and 406 may exhibit behaviors $o_1$-$o_n$. Method 100 may use a well-known HMM clustering algorithm to effect clustering 450, 460. One input to this algorithm may include the number of clusters to generate resembling the k-means clustering algorithm. Given a number of clusters k, the algorithm may begin by creating and randomly initializing k models. Then the method may assign to each model the sequences that best fit each model, and it may retrain those models using the assigned sequences 450, 460. This process may continue until the termination criteria are satisfied. Possible termination criteria may include a fixed number of iterations, a fixed number of iterations without changes in cluster memberships, or a threshold for changes in the probability of the overall model. The probability of the overall model may be computed by multiplying the probability of each sequence on the assigned model:

$$Pr(S|M)=\Pi^k_{i=1}\Pi_{s \in c_i} Pr(\{s|H_i\}).$$

where S is the list of sequences of observations, M is the overall model, k is the number of clusters, $C_i$ is the set of sequences in cluster i, and $H_i$ is the HMM for cluster i.

Method 100 may preferably extend above algorithms in a similar way to the structure learning algorithm, in order to search for the best number of clusters. The method may use an incremental search for the number of clusters that stops when a threshold in the change of probability for the overall model is reached, or until any of the created clusters is empty. For example, an HMM clustering algorithm may resemble the following:

```
Input: S list of sequences to cluster
Input: k number of clusters to create
Output: C₁, ... , Cₖ clusters
for i = 1 ... k do
    Hᵢ ← CreateRandomHMM( );
end
while termination criteria not satisfied do
    C₁ ... Cₖ ← {};
    foreach s ∈ S do
        b ← 1;
        for i = 2 ... k do
            if Pr(s | Hᵢ) > Pr(s | H_b) then
                b ← i;
            end
        end
        C_b ← C_b ∪ {s};
    end
    for i = 1 ... k do
        Hᵢ ← Baum-Welch(Hᵢ, Cᵢ);
    end
end
return C₁, ... , Cₖ.
```

Markov Chains

Method 100 herein may preferably model the dynamic state of each type of entity using a Markov chain. As used herein, a Markov chain may be defined as a finite state model in which the stochastic transitions between states depend only on the current state of the system. The next state of the system is conditionally independent of the previous states given the current state of the system. In a Markov chain, the states are directly observable. A Markov chain may consist of a set of states S, and the following probability distributions:

State Transitions: $Pr(x_{t+1}=s_j|x_t=s_i)$, for all states $s_i$, $s_j \in S$.
Initial states: $Pr(x_0=s_i)$, for all states $s_i \in S$.

The state of the system at step t+1, is only dependent on the state at step t:

$$Pr(x_{t+1}|x_0, \ldots, x_t)=Pr(x_{t+1}|x_t).$$

Probability Estimation

Estimating probabilities on Markov chains may be a straightforward operation. The probability for a given sequence of states is the multiplication of the probability for the initial state by the probabilities of each of the transitions, this is:

$$Pr(x_0,x_0,\ldots,x_t)=Pr(x_0)\Pi^n_{i=1}Pr\langle x_i|x_{i-1}\rangle.$$

Parameter Learning

The methods disclosed herein may also learn the probabilities of a Markov chain. For example, let $n_{ij}$ be the observed number of transitions from state $s_i$ to state $s_j$. The maximum likelihood estimator (MLE) for the transition probability $p_{ij}$ is:

$P_{ij}=n_{ij}/n_i$ where $n_i=\Sigma^{|S|}_{j=1} n_{ij}$ and S is the set of states. If $n_i=0$ then $p_{ij}$ is set to 0.

Structure Learning

Method 100 may preferably leverage one advantage of using Markov chains over using HMMs to model the clustering problem. Specifically, there is no need to execute a separate structure learning for the model to determine a number of states representing a best number. Since the states of the perceived entities may be directly observable, there is no need to search for the best number of states.

Clustering

Method 100 may preferably adapt the clustering algorithm for HMMs above for clustering a Markov chain. Given a number of clusters k, the algorithm may begin by randomly assigning each of the sequences to the k models. Next, it may train each of the k models with the assigned sequences. Finally, it may assign to each model the sequences that best fit each model, and retrain those models using the assigned sequences. This process may continue until there are no changes in the cluster memberships. For example, a Markov chain clustering algorithm may resemble the following:

```
Input: S list of sequences to cluster
Input: k number of clusters to create
Output: C₁, ... , Cₖ clusters
C₁ ... Cₖ ← {};
for each s ∈ S do
    i ← Random(1, ... , k);
    Cᵢ ← Cᵢ ∪ {s};
end
while membership changes do
    C₁ ... Cₖ ← {};
    foreach s ∈ S do
        b ← 1;
        for i = 2 ... k do
            if Pr(s | Mᵢ) > Pr(s | M_b) then
                b ← i;
            end
```

```
            end
                C_b ← C_b ∪ {s};
          end
          for i = 1 ... k do
                M_i ← Learn(M_i, C_i);
          end
    end
    return C_1, ..., C_k.
```

Method 100 may preferably extend this algorithm in a similar way to the HMM clustering algorithm to enable a search for the best number of clusters. Method 100 may find the best number of clusters by incrementally searching for the number of clusters where the searching stops when a threshold in the change of probability for the overall model is reached, or until any of the created clusters is empty.

Method 100 may preferably employ an alternative clustering algorithm. This alternative algorithm may begin with a model for each entity, and then it may merge the models for entities that have compatible models (those that share at least half of the states in common), and this merging may increase the overall probability of the sequences in the combined model.

Clustering Evaluation

Method 100 may periodically assess the accuracy of the clustering algorithms. The method may a metric which may quantify the similarity between the actual classes of the perceived entities and those classes generated by the algorithms. One well-known metric useful in this quantification may be the purity. To compute the purity, each cluster is assigned to the class which is most frequent in the cluster, and then purity is computed by counting the number of entities correctly classified and dividing by the total number of entities:

$$\text{purity}(\Omega, C') = \frac{1}{N} \sum_{\omega \in \Omega} \max_{c \in C'} |\omega \cap C|$$

where $\Omega$ is the set of clusters, and C is the set of classes. One challenge with the purity metric is that a high purity may be achieved when the number of clusters is large. For example, high purity may be found in a situation where each entity may be assigned its own cluster.

Another well-known metric usable for evaluation of clustering accuracy may be known as normalized mutual information (NMI). NMI may allow a tradeoff between cluster quality and number of clusters. The NMI may be defined by:

$$NMI(\Omega, C') = \frac{I(\Omega, C')}{[H(\Omega) + H(C')]/2}$$

where I is the mutual information, and H is the entropy. The mutual information may be defined as:

$$I(\Omega, C') = \sum_{\omega \in \Omega} \sum_{c \in C'} \frac{|\omega \cap C|}{N} \log_2 \frac{N|\omega \cap C|}{|\omega| |c|}$$

and the well-known entropy definition may be:

$$H(\Omega) = -\sum_{\omega \in \Omega} \sum_{c \in C'} \frac{|\omega|}{N} \log_2 \frac{|\omega|}{N}$$

The mutual information (I) may measure the amount of information by which knowledge about the classes may increase when cluster identity is known. The minimum of I is 0 if the clustering is random with respect to the class membership, which means that knowing that an entity is in a particular cluster does not give us any new information about what its class might be. The mutual information I may suffer from the same large number problem as the purity. Thus here, the normalization denominator $[H(\Omega)+H(C)]/2$ is added to maintain reasonable entropy values with increasing numbers of clusters.

Evaluating the Hidden Markov Model Approach

Figures 5A, 5B, 5C, 5D, 5E, 5F:
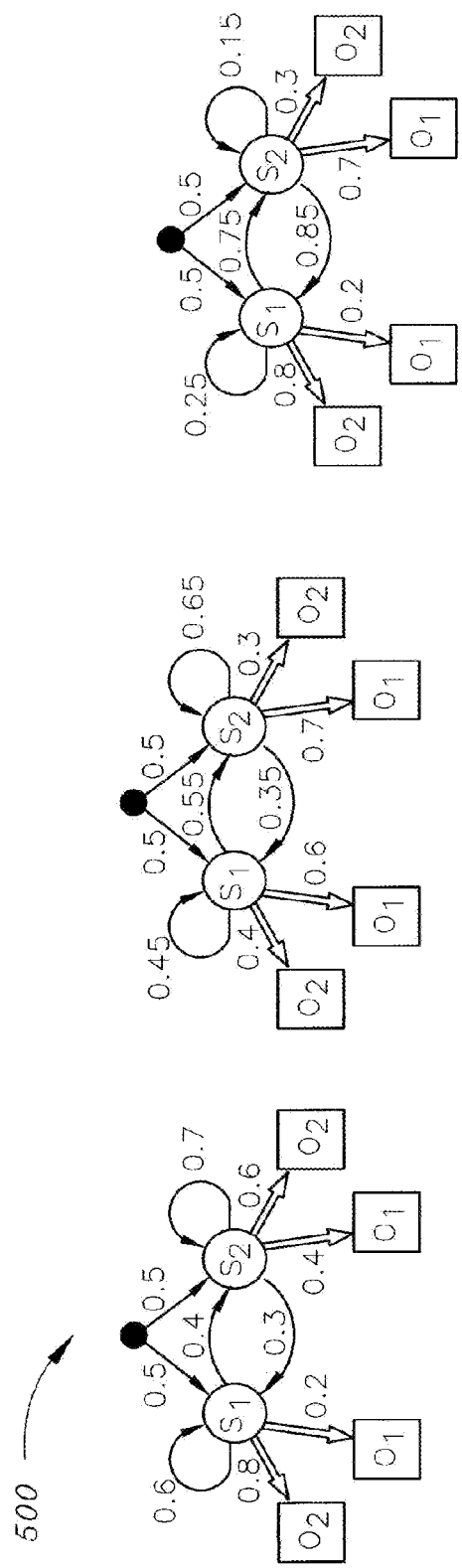
FIGS. 5a-5c are examples of testing results for a clustering algorithm for Hidden Markov Models as background to a preferred embodiment of the present invention.
FIGS. 5d-5f are examples of testing results for a clustering algorithm for Markov chains as background to a preferred embodiment of the present invention.

Referring to FIGS. 5a-5c, examples of testing results for a clustering algorithm for Hidden Markov Models as background to a preferred embodiment of the present invention is shown. Method 100 may periodically evaluate the algorithms used to determine accurate clustering. An evaluation of the clustering algorithm for hidden Markov Models may be represented using data generated from three hidden Markov models. Using these models, a plurality of sequences (here 30) of observations may be generated, each represented by a probability of sequence (i.e. 0.5, 0.35, 0.85, etc.). Each sequence may be generated by one and only one of the models. Also, to determine how the number of observations affects the quality of the clustering, the method may test itself with sequences of different length. For example, a sequence length ranging from 10 observations up to 200 observations with increments of 10 observations may allow for an accurate testing range. Additionally, to determine the variability of the algorithm, the whole testing process may be executed multiple times for each sequence length.

Referring to FIGS. 9a and 9b, box-plots of normalized mutual information (NMI) and purity representative of HMM algorithm testing results applicable to a preferred embodiment of the present invention are shown. Method 100 may periodically evaluate NMI and purity for each of the clustering algorithms and each for sequence length. Noteworthy in both FIGS. 9a and 9b; NMI may increase with increased sequence length while Purity may also increase with increased sequence length.

Evaluating the Markov Chain Approach

Referring back to FIGS. 5d-5f, examples of testing results for a clustering algorithm for Markov chains as background to a preferred embodiment of the present invention is shown. Evaluation of the clustering algorithms for the Markov chains may be accomplished using data generated from three Markov chains. The models that may be used for testing the algorithms may generate 30 sequences of observations. As above, each sequence may be generated by one and only one of the models. Also, to determine how the number of observations affects the quality of the clustering, the algorithms may be tested with sequences of different length. For example, sequence lengths ranging from 100 observations up to 1000 observations with increments of 100 observations may be employed. Additionally, to check the variability of the algorithm, methods disclosed herein may execute the testing process multiple times for each sequence length.

Figure 10B:
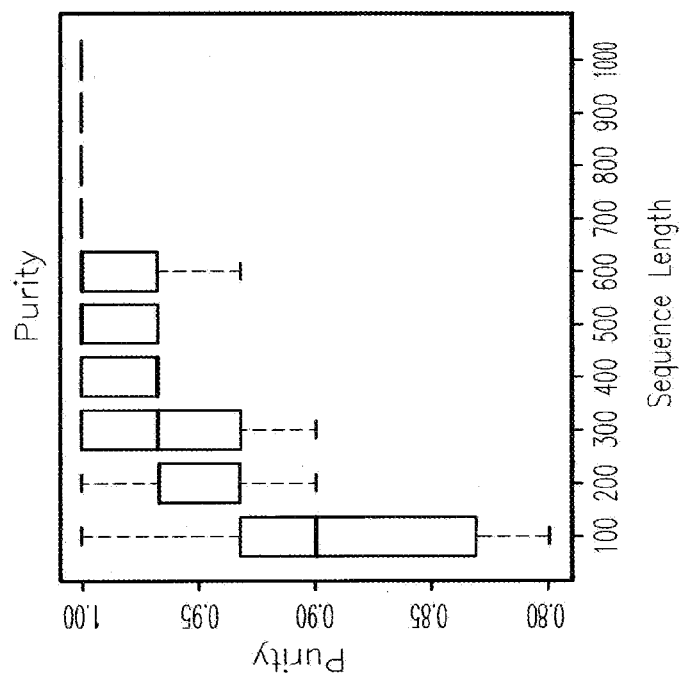
FIGS. 10a and 10b are box-plots of NMI and purity for each Markov chain clustering evaluation applicable to a preferred embodiment of the present invention.
Figure 10A:
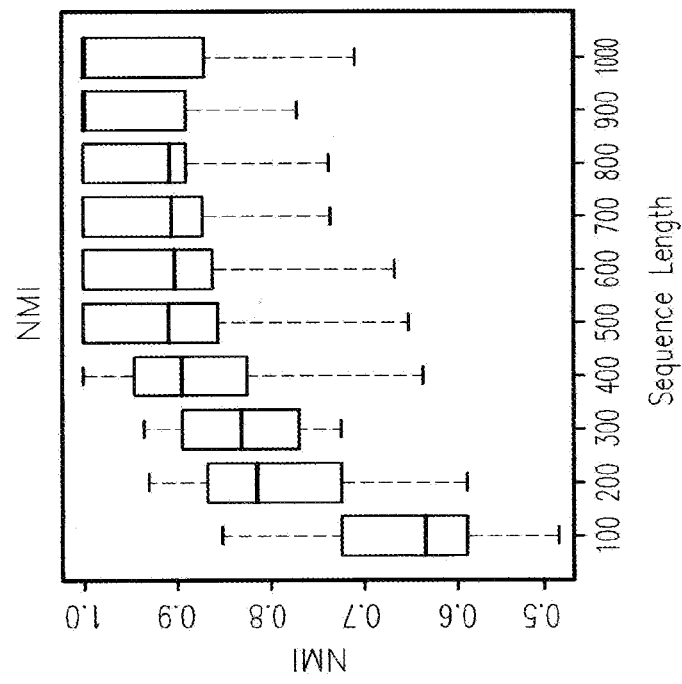

Referring to FIGS. 10a and 10b, box-plots of NMI and purity for each Markov chain clustering evaluation applicable to a preferred embodiment of the present invention are shown. Again, as expected, testing results may indicate the quality (NMI and Purity) of the clustering increases with increasing sequence length.

Detection Probability/Accuracy

Figure 6:
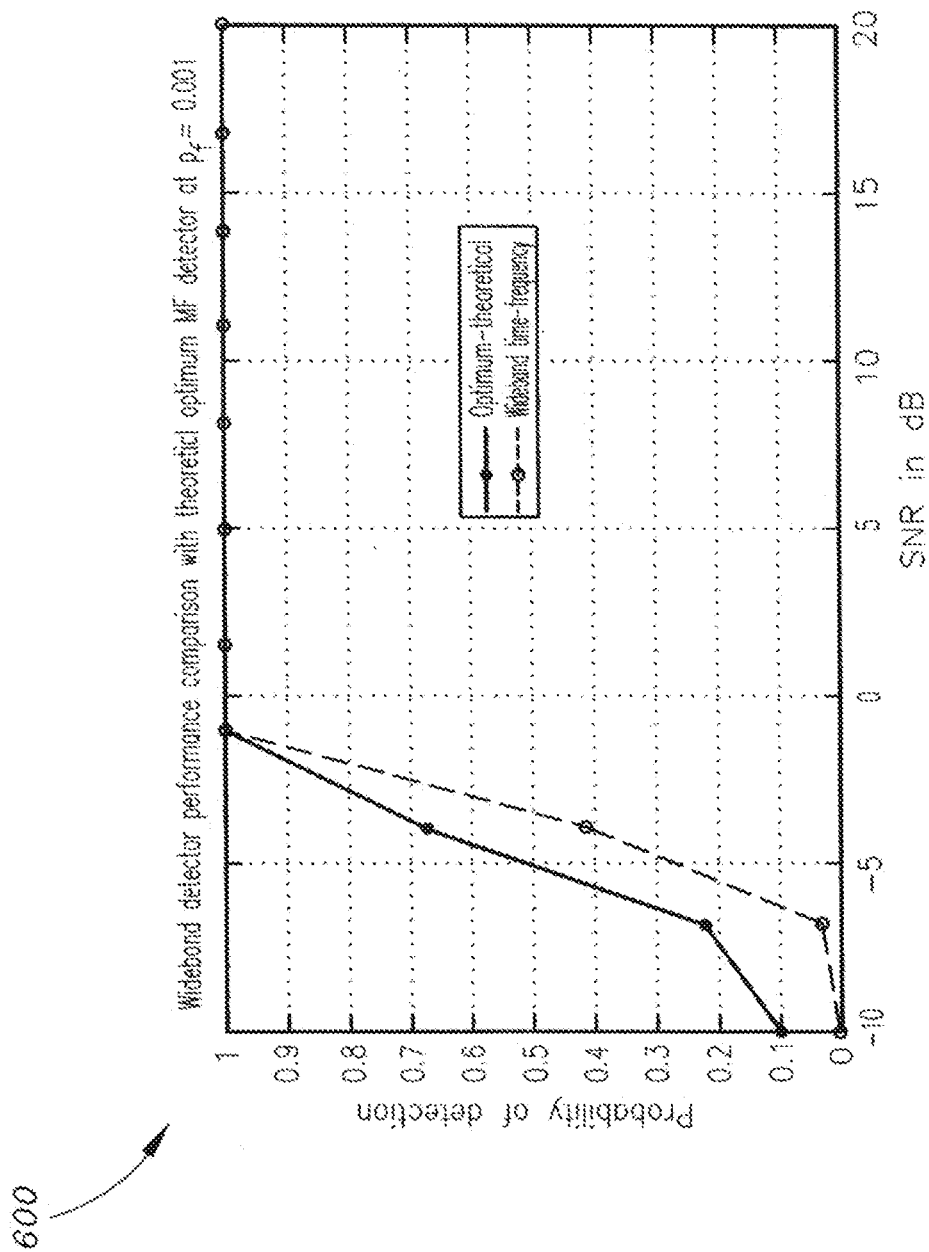
FIG. 6 is a graph of probability of detection related to signal to noise ratio applicable to a preferred embodiment of the present invention.

Referring to FIG. 6, a graph of probability of detection related to signal to noise ratio applicable to a preferred embodiment of the present invention is shown. As can be seen, probability of detection reaches 100% at SNR values greater than −1.

Figures 7A, 7B, 7C:
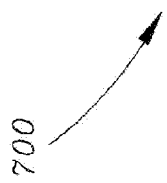
FIGS. 7a-7c are graphs of accuracy associated with modulation type and device names applicable to a preferred embodiment of the present invention.

Referring to FIGS. 7a-7c, graphs of accuracy associated with modulation type and device names applicable to a preferred embodiment of the present invention are shown. Method 100 may receive signals from the various models of transmitters shown enabling identification of the monitored transmitter.

Figure 8:
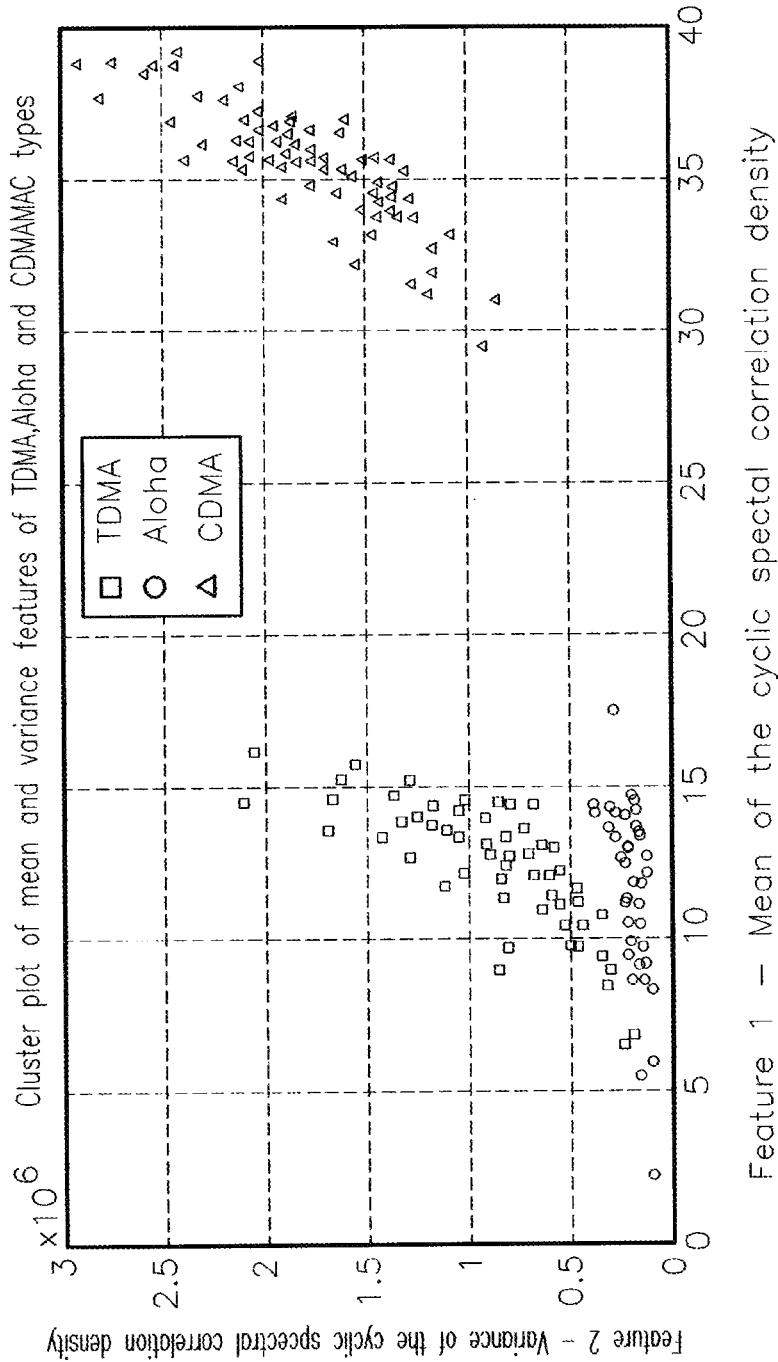
FIG. 8 is a cluster plot of mean and variance features of Time Division Multiple Access (TDMA), Aloha, and Code Division Multiple Access (CDMA) Medium Access Control (MAC) types applicable to a preferred embodiment of the present invention.

Referring to FIG. 8, a cluster plot of mean and variance features of Time Division Multiple Access (TDMA), Aloha, and Code Division Multiple Access (CDMA) Medium Access Control (MAC) types applicable to a preferred embodiment of the present invention is shown. Using the mean plotted against the variance of the cyclic spectral correlation density, the methods disclosed may more accurately identify which of the multiple access schemes are being used by the transmitter.

Evaluation of Markov Chain Alternative Clustering Algorithm

Method 100 may preferably use a Markov Chain Alternative Clustering algorithm to determine the classification of a perceived entity. Method 100 may periodically self-evaluate the preferred Markov chain alternative clustering algorithm to determine accuracy. The evaluation may involve a realistic scenario including multiple behaviors and multiple activities. The behaviors may include involve differing mobility and changes in RF behavior. For example, a previously stationary entity using a first transmission power may begin to move and begin to use a second transmission power. Method 100 may analyze these changes and apply the changes to each sequence. Other examples of RF changes may include frequency hopping, changes in transmission power or waveform, communication patterns, etc.

Figures 11A, 11B:
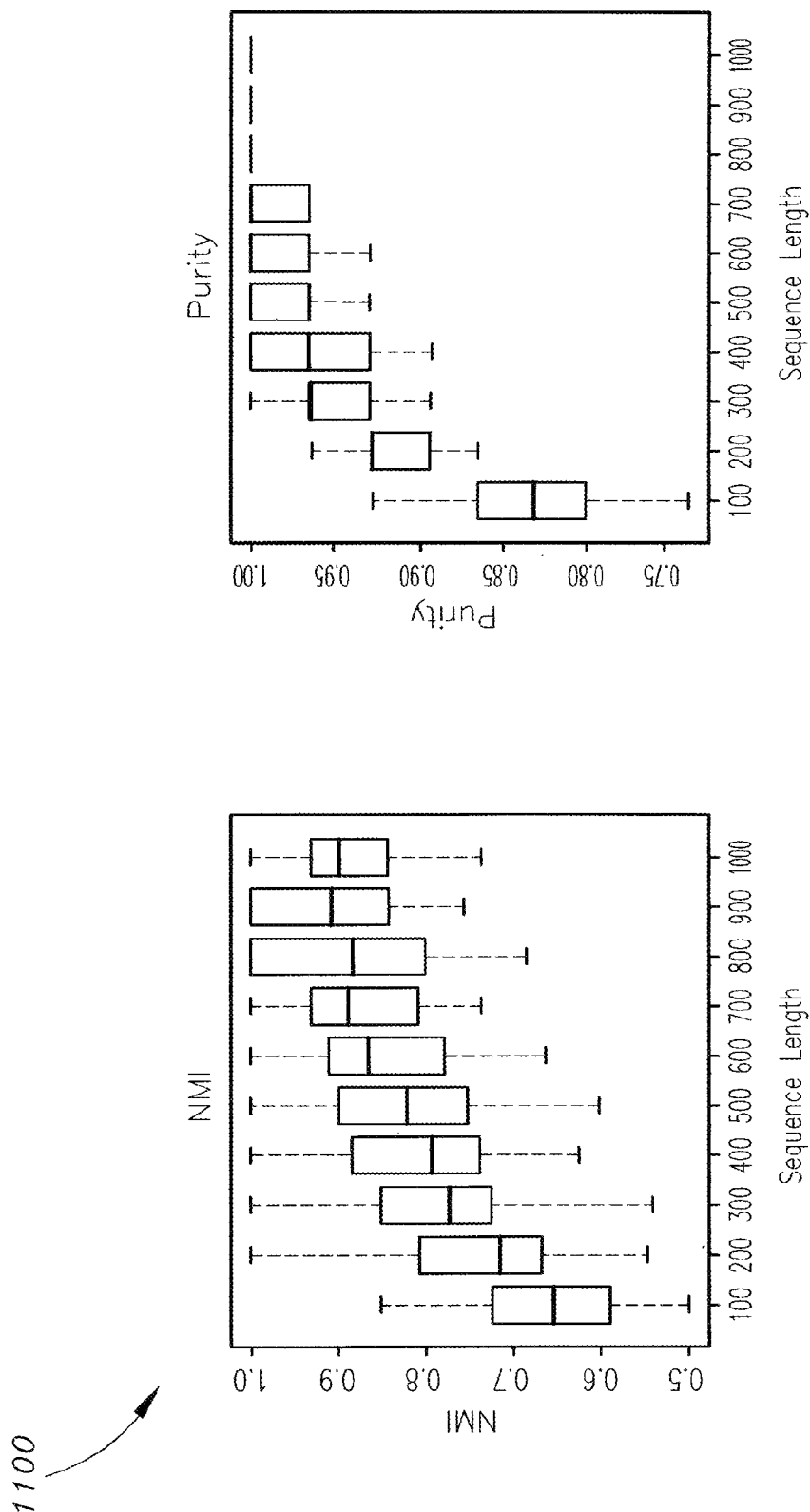
FIGS. 11a and 11b are box-plots of NMI and purity for each Markov chain alternative clustering evaluation representative of a preferred embodiment of the present invention.

Referring to FIGS. 11a and 11b, box-plots of NMI and purity for each Markov chain alternative clustering evaluation representative of a preferred embodiment of the present invention are shown. Again, as expected, NMI and purity increase with increasing sequence length.

Method 100 may employ simulation scenarios known as an event driven simulator to preferably evaluate the algorithms. Simulation events may include a well-known path loss model and an interference model. The path loss model may include a well-known log-distance path loss model, with a path loss exponent able to be parameterized by the type of terrain. An interference model may keep a list of interference events (other packets or signals), in order to build a stepwise function of the signal to noise plus interference ratio (SNIR).

Figure 12:
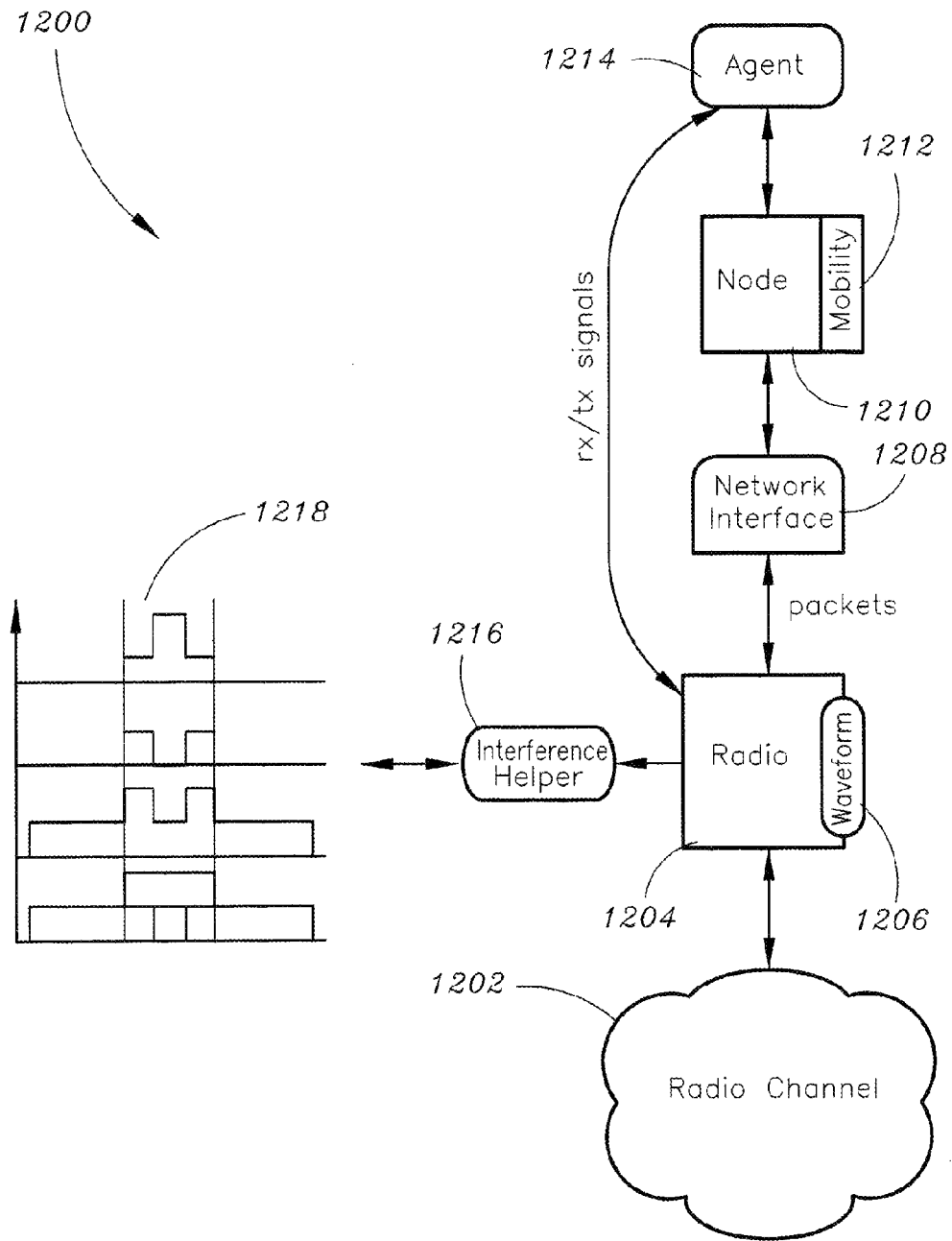
FIG. 12 is a diagram of a basic structure of a simulated node applicable to a preferred embodiment of the present invention.

Referring to FIG. 12, a diagram of a basic structure of a simulated node applicable to a preferred embodiment of the present invention is shown. To properly simulate accurate scenarios and obstacles, the simulation method 1200 may simulate an agent 1214 accessing a radio channel 1202 via radio 1204, through a node 1210 and the network interface 1208. Node 1210 may incorporate mobility 1212 as one simulated obstacle while interference helper 1216 may incorporate an model 1218 as an additional simulated obstacle. Waveform 1206 may add an additional variable to more realistically simulate actual conditions.

Simulator 1200 may realistically provide barriers to communication. For example, interference model 1218 may keep a list of interference events (other packets or signals), to build a stepwise function of the SNIR. In software used to model the simulation, the only interference events available may include packets. Therefore, to accurately simulate SNIR, interference helper 1216 must continue to send packets. In exemplary simulations, simulator 1200 must specify a signal time duration. Using the SNIR function, the Bit Error Rate (BER) for the packet may also be computed. Simulator 1200 may then use the BER and a random number generator to indicate when packet is dropped or received. Simulator 1200 may further provide additional mobility models and additional traffic generation patterns to construct complex scenarios.

Simulator 1200 may allow disclosed methods to capture the main set of attributes needed for the classification algorithms. For example, the raw attributes may include the identifiers of the radios, frequencies, bandwidth, waveforms, transmit power, MAC protocol, voice id, position, heading, speed and the like. From these raw attributes, a second set of attributes and behaviors may be inferred. For example, this second set of attributes may include communication patterns, frequency hopping patterns, waveform patterns, etc. These inferred attributes may then be made available to the clustering algorithm on each time step as a single observation as described herein below in greater detail. The clustering algorithm may further use the sequences of observations to group the nodes in different clusters.

An Exemplary Scenario

Simulator 1200 may incorporate a plurality of scenarios to determine accuracy of the preferred method disclosed herein. For example, one scenario that simulator 1200 may incorporate for testing may include a plurality of players, cities, transmitters, and geography.

Figure 13:
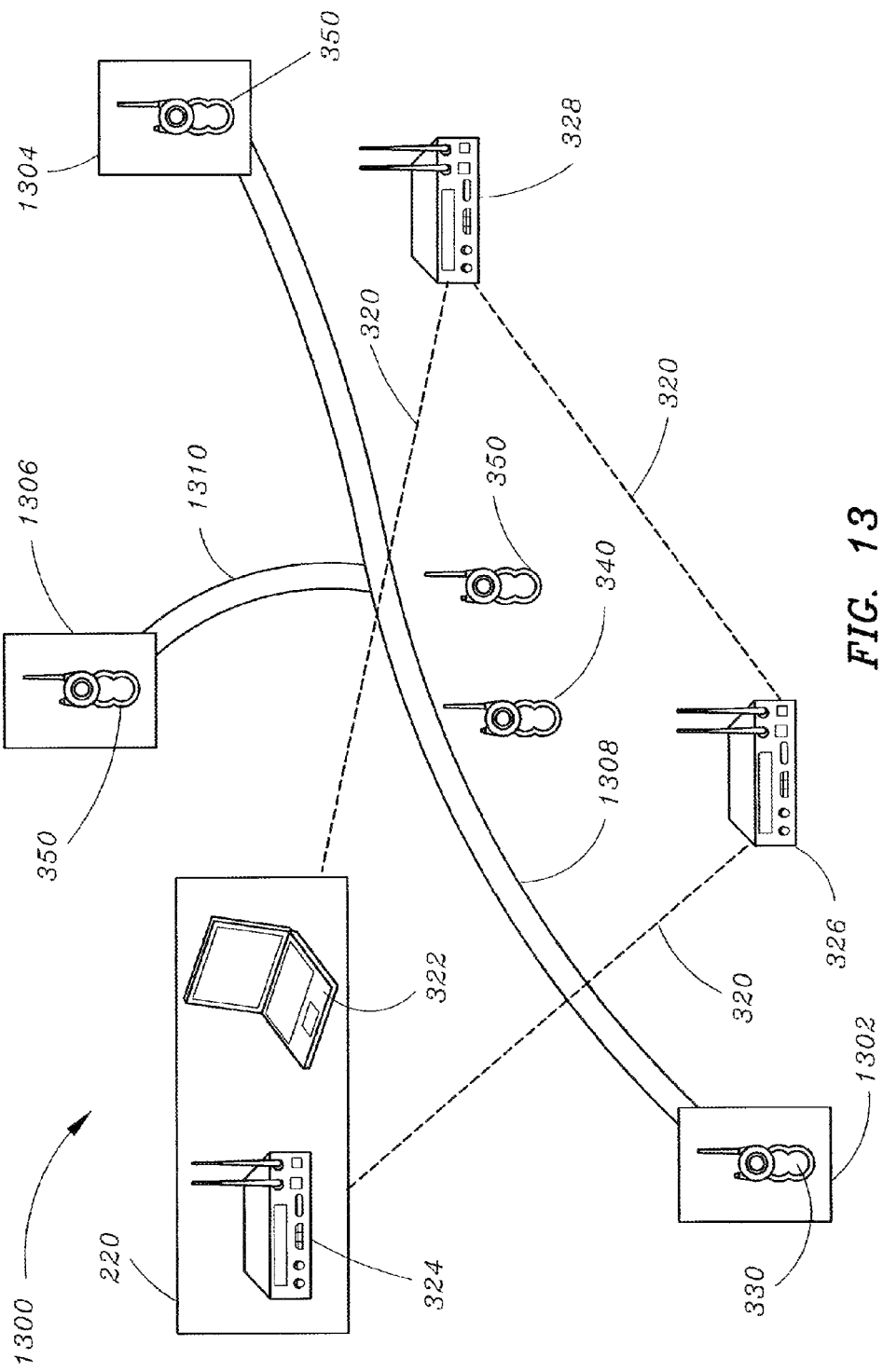
FIG. 13 is a diagram of a simulation overview applicable to a preferred embodiment of the present invention.

Referring to FIG. 13, a diagram of a simulation overview applicable to a preferred embodiment of the present invention is shown. For example, one story in a scenario may include blue forces needing to travel from City 1302 to City 1304 to perform a mission. Road 1308 may connect City 1302 to City 1304. Between these two cities there are hills and wooded areas on one side of road 1308 and desert on the other side. There is a town 1306 with an enemy transmitter 350 in the desert area. In both the cities there are people with different types of handsets/radios such as high power cordless phones, radio transmitters, and cellular phones.

Adversaries may use similar equipment as other perceived entities. For example, in these two cities 1302, 1304 and the town nearby 1306, there may be other transmitters such as TV/radio stations providing additional RF input as a challenge to accurate identification. Blue forces in City 1302 with friendly transmitter 330 start a conversation on the mission plan. Friendly transmitter 330 may be representative of a group of friendly transmitters which create individual blue nodes. These blue nodes may exhibit a hierarchical communication structure. For example, FT1→FT2→FT3→FT6. Similarly, a backwards chain of command: FT3→FT2→FT1. At the same time, three additional people represented by neutral transmitter 340 (nodes NT1, NT2, and NT3) are having a bi-directional conversation on their cell phones. Also, some people using enemy transmitter 350 near the road 1308 are plotting to emplace IEDs on the road 1308 and blow them when the Blue force convoy passes by while going to City 1304. These individual nodes may talk to each other with no particular order.

Additional transmitters may be actively transmitting in City 1304. For example, one TV station (not pictured) and two radio stations (also not pictured) may be broadcasting a combination of news and music. Later on, friendly transmitter 330 may begin to move from city 1302 to city 1304. FT1 begins to communicate with additional entities in the simulation. People transmitting on neutral transmitter 340 also start to move. One of them (NT2) starts a conversation with one of the adversaries (e.g., ET4) along the road. One of the radio stations changes frequency.

Continuing with the simulation 1300, adversaries from the town 1306 transmitting on enemy transmitter 350 establish communications with the people along the road using enemy transmitter 350 and with the people in City 1304 using enemy transmitter 350. All the enemy transmitters 350 may be using a frequency hopping pattern that changes often without any particular order. People along the road transmitting on neutral radio 340 begin to move toward the road. People on the cell phones (NT1, NT3) stop on the side of the road. NT2 who started a conversation with ET4 stops the conversation, moves into the wooded area, changes waveform and frequency, and joins the network of additional enemy transmitters 350. ET4 moves into the area close to a blue node FT6. ET4 changes power and frequency of transmission and receives at some other frequency and power. ET4 starts frequent movements to and from FT6 following the convoy of blue nodes. FT1-FT6 are moving on the road in the direction of City 1304 at nominal speed and are communicating with each other using a specific frequency hopping pattern that repeats. NT1 and NT3 start to slowly move on the shoulder of the road. FT1-FT6 pass a hilly area and they increase the transmission power and change the waveform suitable for that terrain.

The simulation 1300 continues with ET5 at 350 communicating with NT3 with normal frequency hopping pattern with no change in the waveform. NT1 and NT3 at 340 start their cellular phone conversation with infrequent change/no-change in the frequency hopping pattern. NT1 and NT3 stop at the town 1306 near city 1304 and handoff the phones to some other people. Blue force shift changes and the nodes FT1-FT6 are being operated by a different group who are in the second shift and they are nearing the town 1306. Blue nodes FT1-FT6 change frequency and waveform suitable for the desert terrain. Additional nodes (e.g., AB3-AB5) are in and out of an additional AB network with burst changes in traffic pattern. ET4 fails to transmit or receive for a prolonged period. ET1-ET3 suddenly move toward the road at a very high speed with sudden increase in transmit power in bursts.

As the simulation 1300 continues, FT2 at 330 transmits some confusing data in the same waveform as that being used by ET1-ET3 at enemy transmitter 350. In reaction to the confusing data, ET1-ET3 change waveforms often and traffic pattern MAC/network protocol trying to establish network activity assuming FT2 is an additional enemy and attempting to communicate. FT4 at friendly transmitter 330 moves closer to ET1-ET3 at 350. ET1-ET3 increase RF traffic with additional unknown entities. NT3-NT5 join ET1-ET3 and decrease traffic as FT4 moves away and changes waveform. FT2-FT5 jam a head node NT5 of NT3-NT5 and ET1-ET3. NT5 decreases power, changes waveform and hands off to ET3. NT3-NT5 and ET1-ET3 move away from the road 1308. ET2 starts communication with Net FT1-FT6 are now close to City 1304. Blue force nodes in City 1304 FT7-FT9 move close to NT1-NT2. NT1 increases power and jams FT7. FT7 changes waveform and power. NT1 also changes to same waveform and jams. Finally, FT1-FT6 reach City 1304 and accomplish the mission.

Simulation 1300 may be exemplary captured by reception nodes 324, 326, 328. Reception nodes may be in data communication via data link 320 with workstation 220. Processor 322 may exemplary receive data from reception nodes 324, 326, 328 and execute the disclosed methods to identify and classify the perceived entities.

Evaluation

To evaluate the performance of the clustering algorithms in the scenario, simulation 1300 may preferably divide the data processing tasks into three levels. For example, levels 1, 2 and 3 may exemplify one embodiment of the present invention. For example, Level 1 may collect the raw data of the scenario/simulation provided by each entity. Level 2 may engage analysis to detect higher level behaviors for each monitored entity. Finally, Level 3 may include the FFN classification accomplished by the clustering algorithms. The output from level 1 may be the input for level 2, and the output from level 2 may be the input for level 3. Each level may have distinct time periods for processing data. For example, Level 1 may capture and process data at the sub-second scale, Level 2 may processes data at the sub-minute scale, and level 3 may process data at the sub-hour scale.

Level 1

For each monitored entity, and for each simulated entity, method 100 may collect, at regular intervals of time, a plurality of characteristics of each signal received. For example, method 100 may collect the following first level characteristics:

1 Time: the time when the sample was collected.
2 Node ID: a unique node identifier.
3 Position: a node's position.
4 Velocity: a node's vectorial velocity.
5 Voice ID: a unique identifier for the person associated with the radio.
6 Waveform: a waveform used by the node during the current interval, or empty if the node hasn't transmitted anything during the last interval.
7 Frequency: a frequency used by the node during the current interval, or empty if the node hasn't transmitted anything during the last interval.
8 Bandwidth: a bandwidth used by the node during the current interval.
9 Transmission Power Range: a minimum and maximum transmission power used by the node during the current interval.

Method 100 may further report this information to level 2 for additional processing.

Level 2

Level 2 may receive raw data from Level 1 and further process data to accomplish a higher measure of analysis. Level 2 may collect data reported by level 1 and also at regular intervals performs statistical analyses on these data to generate a dataset of second level characteristics. For example, a preferred embodiment of the present invention may comprise a data set of 7 separate characteristics generated by an analysis of the data from level 1. These level 2 characteristics, and preferable further descriptors of each may comprise:

Command Chain
        Hierarchal
        Bi-Directional
        Chaotic
    Frequency Hopping Pattern
        Infrequent
        Periodic
        Frequent
    Mobility Change Pattern
        Infrequent
        Periodic
        Frequent
    Traffic/Mobility Correlation
        Correlated
        Uncorrelated
    Transmission Power Utilization Pattern
        Increased
        Normal
    Voice-ID Change Pattern
        Infrequent
        Periodic
        Frequent Waveform Change Pattern
  Infrequent
  Periodic
  Frequent The following sections exemplary describe each of these preferred second level characteristics in more detail.

Command Chain

The command chain analysis component may determine, for each node, whether the node is currently part of a 1) hierarchical, 2) bidirectional or 3) chaotic mode of communication. For example, hierarchical may be defined as repeated communications from one node to another, followed by continued reverse communication. From this back and forth, method 100 may infer there is a hierarchical relationship between the two communicating nodes. Bidirectional may be defined as simply two way communications, representative of little or no repetitive communication. Finally, chaotic may be defined as no pattern of communications between two nodes.

For performing this type of analysis method 100 may first need to construct a graph with the communication paths in the scenario. The only information method 100 may rely on for doing this analysis are the level 1 intervals during which each node transmitted information. Given two nodes A and B, it will only be possible to determine if A is communicating with B if node B is also transmitting information. If node B is only listening, then the method will not be able to discover this particular communication path.

For example, for every pair of nodes, method 100 may try to determine if the pattern of transmission of both nodes is correlated or if they are independent of each other. As used herein, a correlated transmission may be defined as temporal transmission from each of the nodes. For example, a correlated conversation may be found where one node is transmitting within the same minute as the other node. Uncorrelated as used herein may find no temporal correlation. Method 100 may incorporate two different implementations of the determination component to determine whether the patterns of transmission of two nodes are correlated or independent.

A preferred first implementation may use a well-known likelihood-ratio test for independence. For example, given nodes A and B, with their corresponding time series of transmissions (TxA and TxB), method 100 may perform the likelihood-ratio test between TxA and TxB, and then also use lagged versions of TxA and TxB to examine history. As used herein, a time series of transmissions may be defined as a sequence of 1s and 0s, where a value of 1 indicates the node transmitted during that interval, and a value of 0 means that the node did not transmit during that interval.

Should method 100 find the criteria for the time series of transmission tests are met, method 100 may indicate that there is a communication path between A and B leading to a command chain between the two nodes. After communication path has been designated, method 100 may determine the directionality or bi-directionality of the link depending on when a lagged version of the time series yields a historical correlation.

A second alternative implementation of the transmission correlation component may use a well-known Granger causality. Given nodes A and B, with their corresponding time series of transmissions (TxA and TxB), method 100 may determine if A Granger-causes B. To implement, method 100 may first construct a linear regression model for TxB using lagged versions of TxB. Then method 100 may construct a second linear regression model for TxB using also the lagged versions of TxB. However, in addition to the lagged versions, method 100 may include lagged versions of TxA. Finally, method 100 may perform a well-known F-test to compare both models. If the second model produces a result better than the first model, method 100 may declare that A Granger causes B and method 100 may find that a hierarchical relationship exists between A and B and may add that link to the graph. Should method 100 find no link, the command chain may be indicated as chaotic.

Frequency Hopping Pattern

Method 100 may analyze a frequency hopping pattern to determine a correlation between perceived entities and further to classify the perceived entity. For example, a frequency hopping pattern analysis component may determine if the frequency hopping patter of a node is 1) periodic, 2) frequent or 3) infrequent. Using the data provided by level 1, method 100 may construct a time series with the transmission frequencies used by the node. In this time series method 100 may only report a frequency if it's different from the frequency that was used immediately before. Method 100 may also track a separate time series with the time intervals between each change of frequencies. Using the first time series, method 100 may first determine if the hopping pattern is periodic. Then, using the second time series method 100 may determine the average hopping interval. If the average hopping interval is below a certain threshold, method 100 may determine the hopping pattern is frequent, otherwise method 100 may determine the hopping pattern is infrequent.

Mobility Change Pattern

Method 100 may analyze node mobility as one tool in an identification of the node. For example, method 100 may determine, using a mobility change pattern analysis component, if a node exhibits 1) frequent or 2) infrequent changes in mobility. Using the data provided from level 1, method 100 may construct a time series with the time intervals between each significant change in mobility. A significant change in mobility may be defined herein as a change in speed or heading beyond a certain threshold, since the last reported change.

Then, using the time series of time intervals, method 100 may determine the average change interval. If the average interval is below certain threshold, method 100 may determine the mobility change pattern is frequent, otherwise method 100 may determine that the mobility change pattern is infrequent.

Traffic/Mobility Correlation

Method 100 may use a traffic/mobility correlation to determine whether the traffic/mobility is 1) correlated or 2) uncorrelated. As used herein, a correlated traffic/mobility may be defined as temporal movement of node transmitting within a time threshold. For example, correlation may be found here where two nodes are mobile and transmitting within the same time threshold. For example, method 100 may construct two time series for each node: one based on transmissions and another based on mobility. The transmissions time series may preferably record, at a coarser granularity, the number of raw-time steps during which the node transmitted any signal. The mobility time step may preferably collect the total distance that the node moved during the same granularity of time. Method 100 may then correlate the transmissions time series of each node with the mobility time series of each of the other nodes to determine if the transmission pattern of the node correlates to the mobility of any of the other nodes.

Transmission Power Utilization Pattern

Method 100 may use a transmission power utilization pattern to attempt to correlate nodes. For example, method 100 may construct a time series with the transmission power used by each node to determine if a node may display 1) a sudden increase in power, and 2) a normal power use. If the node suddenly uses a transmission power that is beyond the average plus standard deviation of the utilization pattern of the node, then method 100 may determine the node has a sudden increase in power. Otherwise the power utilization of the node may be considered normal.

Voice-ID Change Pattern

Method 100 may track a Voice ID for each perceived entity to determine if a change in Voice ID is 1) frequent, 2) normal, or 3) infrequent. For example, method 100 may construct a time series for each node with a timestamp for each change in voice-ID. If the average interval between changes in voice-ID is smaller than a first threshold, then method 100 may determine the change pattern is frequent. If the average interval is greater than the first threshold but smaller than a second threshold, then the change pattern is said to be normal. If the average interval between changes in Voice ID is greater than the second threshold, method 100 may determine the change pattern to be infrequent.

Waveform Change Pattern

Method 100 may analyze waveform change pattern for each perceived entity to determine if waveform change pattern is 1) frequent, 2) normal, or 3) infrequent. For example, method 100 may construct a time series for each node with a timestamp for each change in waveform. If the average interval between changes in waveform is smaller than a first threshold, method 100 may determine the change pattern is frequent. If the average interval is greater than the first threshold but smaller than a second threshold, method 100 may determine the change pattern is normal. If the average interval between changes in waveform is greater than the second threshold, method 100 may determine the waveform change pattern to be infrequent.

Level 3

Following an analysis of each of the second level characteristics, method 100 may make the level 2 data available to Level 3 algorithms to determine a final Identification and classification. Level 3 may include use of the alternative clustering algorithms to determine a final result. Method 100 may combine each of the analysis components from level 2 to a single observation. Method 100 may then give the sequences of these observations for each of the perceived entities to the alternative clustering algorithms.

Simulation Scenario Results

The simulation of FIG. 13 notionally contained 60 nodes. Preferably, the clustering algorithms may be executed at intervals of 1000 seconds, the level 2 observations may be taken every 10 seconds, totaling 100 observations on each interval. For example, should clustering algorithms and level 2 observations continue with this interval, results may be consistent.

Figures 14A, 14B:
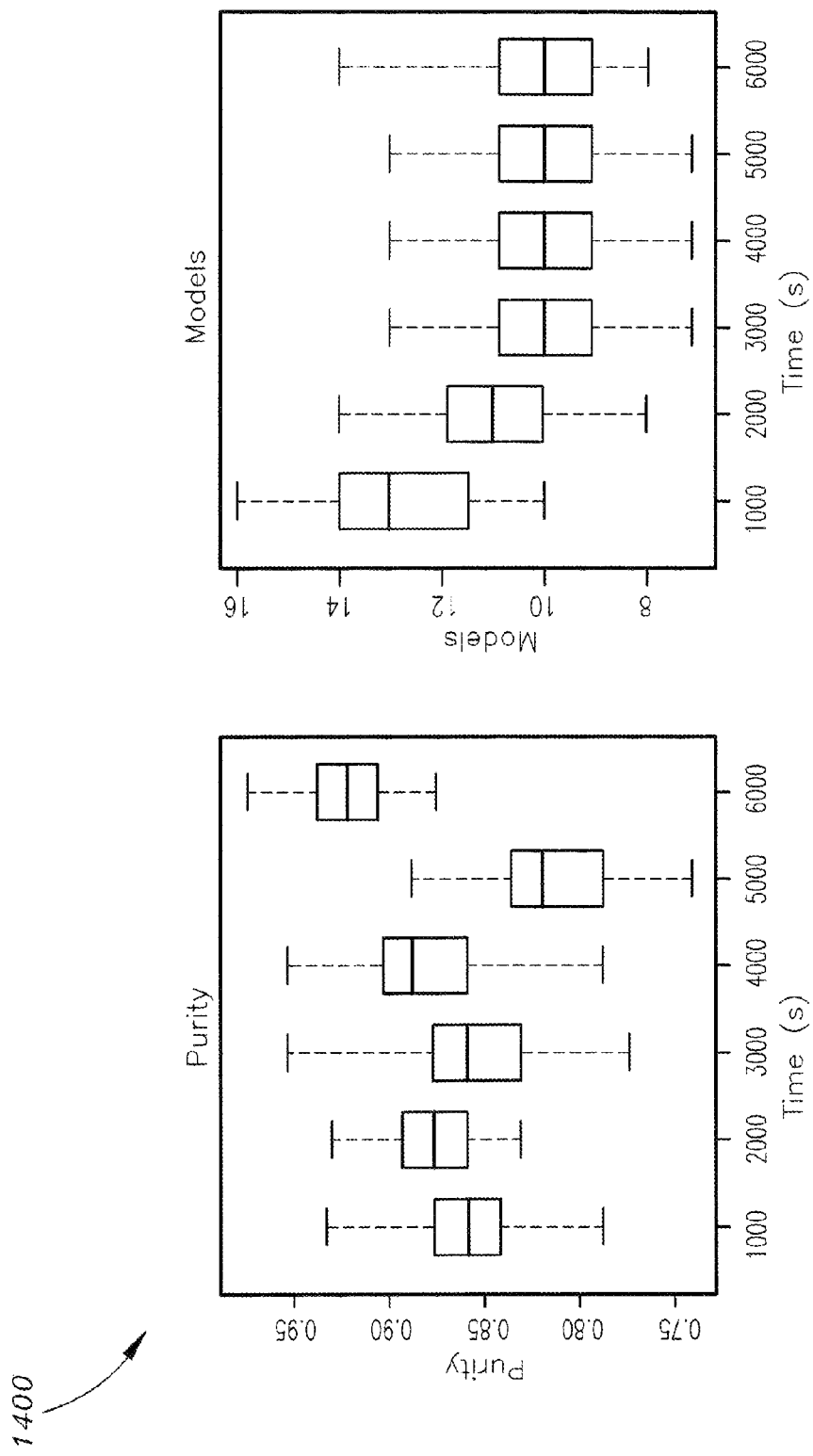
FIGS. 14a and 14b are graphs of purity and number of models of scenario results for Markov Chain Clustering associated with time, exemplary of a tested embodiment of the present invention.

Referring to FIGS. 14a and 14b, graphs of purity and number of models of scenario results for Markov Chain Clustering associated with time, exemplary of a tested embodiment of the present invention is shown. In general, the indicated purity in FIG. 14a maintains above a favorable 80%. At the end of the simulation, the purity reaches around 95%. FIG. 14b indicates how the number of models evolves across the simulation. The number of models decreases with time and stabilizes around 10 models.

Figure 15:
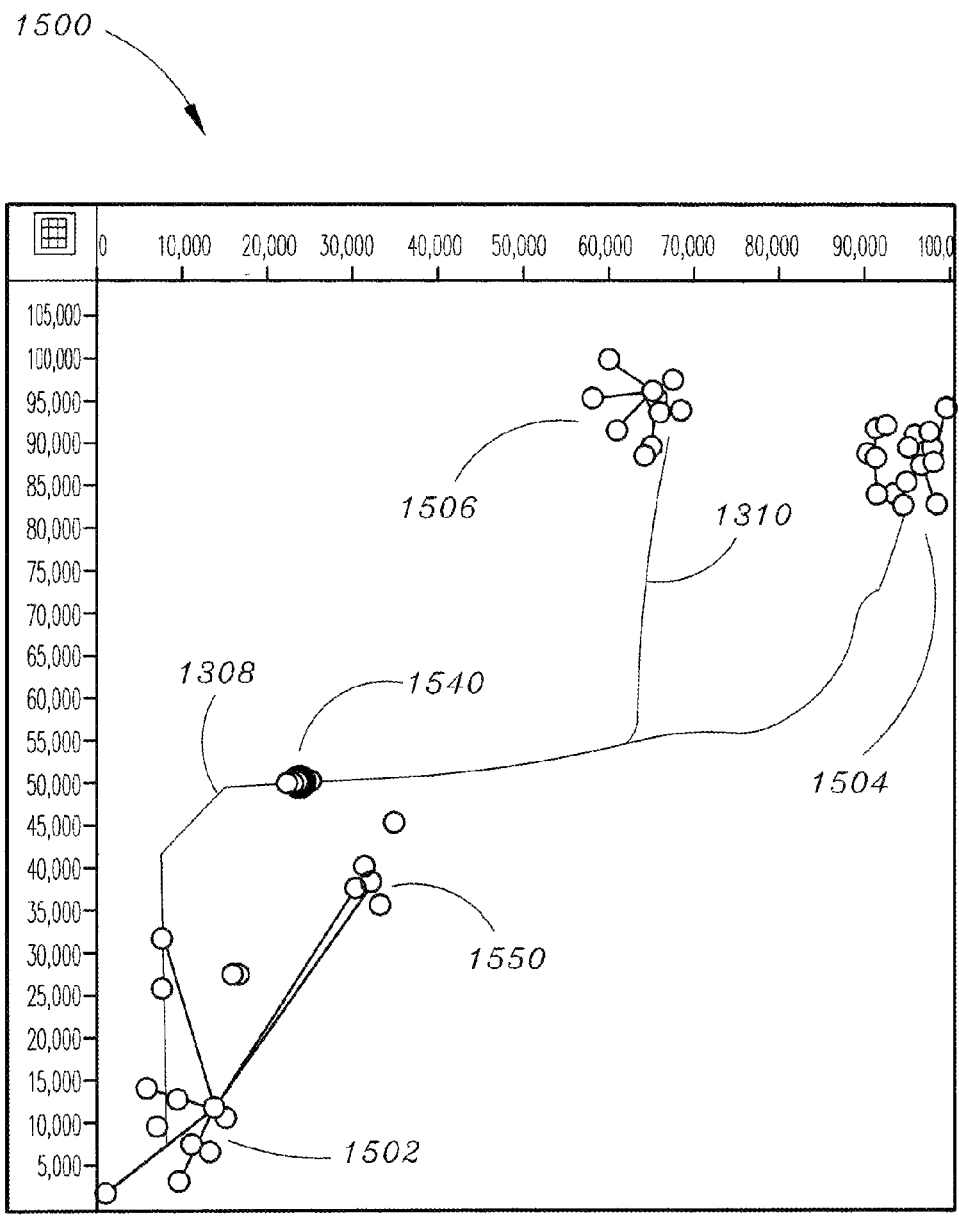
FIG. 15 is an example of a simulation of FIG. 13 with associated nodes and communication applicable to a preferred embodiment of the present invention.

Referring to FIG. 15, an example of a simulation of FIG. 13 with associated nodes and communication applicable to a preferred embodiment of the present invention is shown. It can be seen that when the simulation 1300 is paused, it may display the models that were generated and the nodes that belong to that particular model. Specifically, cluster of nodes at 1502 may correspond to City 1302, cluster of nodes at 1506 may correspond to town 1306, and cluster 1504 may correspond to city 1304. Roads 1308 and 1310 may be indicated.

Simulation 1300 may indicate enemy transmitters at 1550 and neutral transmitters at 1540. Also a preferred embodiment may indicate colors as each node may transition from one classification to another. For example, a friendly node may be colored blue, neutral nodes green, and foe classified nodes red. This dynamic scenario may change over time, with nodes transitioning from foe to neutral based solely on perceived RF parameters.

Figure 16:
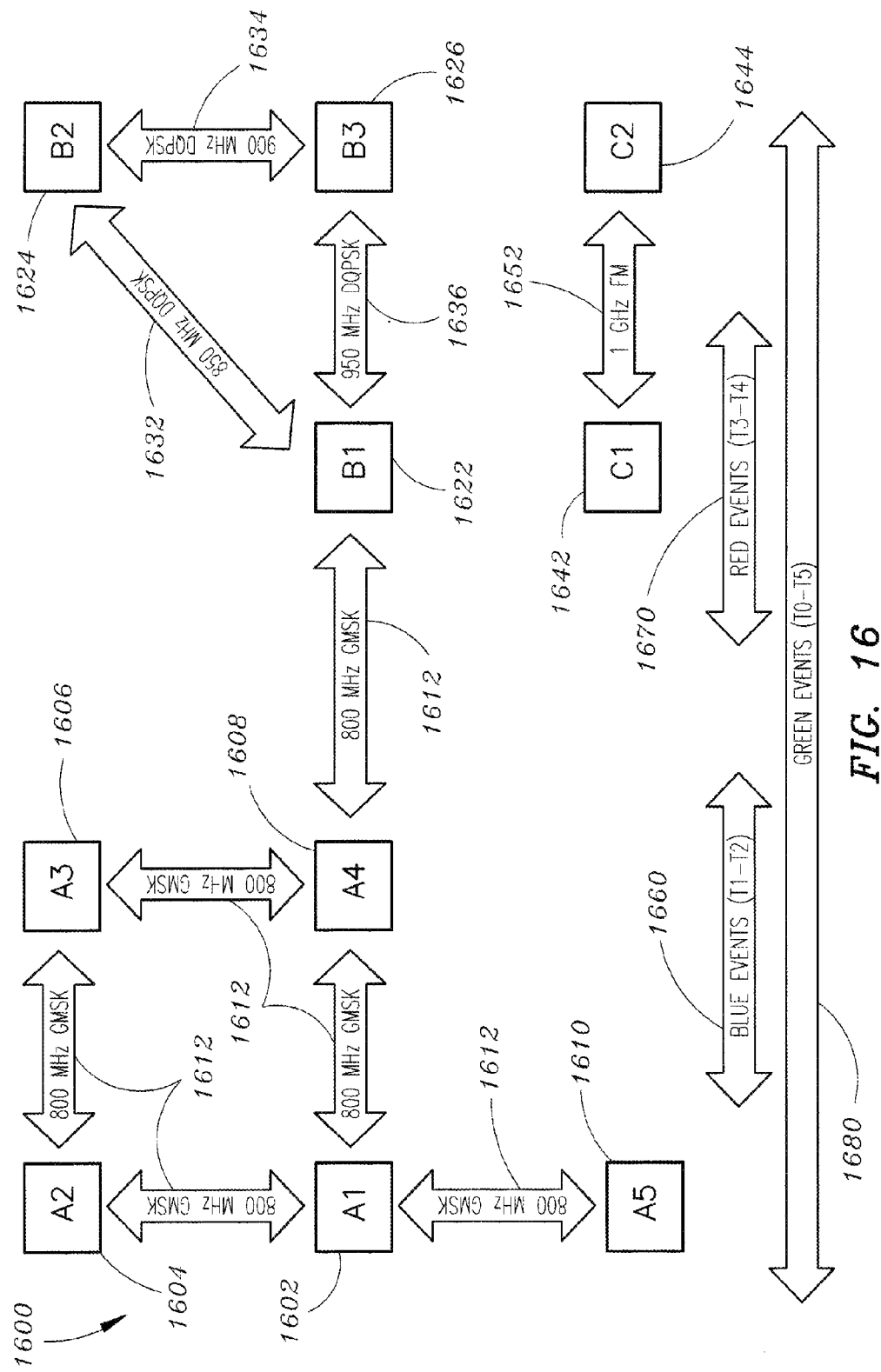
FIG. 16 is a diagram of a scenario for Friend/Foe/Neutral classification using three networks and time based events in accordance with a preferred embodiment of the present invention.

Referring to FIG. 16, a diagram of a scenario for Friend/Foe/Neutral classification using three networks and time based events in accordance with a preferred embodiment of the present invention is shown. Method 100 may also evaluate friend/foe/neutral determination systems using real measurements received from radios configured to receive and evaluate signals as different networks. For example, a commercially available radio from Universal Software Radio Peripheral (USRP) may be of use in an embodiment of the present invention. In FIG. 16, three network configurations are shown and also some activities that happen while communication is taking place in these three networks. For example, a network of nodes A1 through A4 1602, 1604, 1606, 1608 is shown communicating between each node. One method to identify the network may include the frequency, here 800 MHz and phase Gaussian Minimum Shift Keying (GMSK) 1612 used to communicate.

Similarly, network B1-B2-B3 1622, 1624, 1626, may be networked based on phase, here a differential quadrature phase shift keying (DQPSK) where frequencies are dissimilar 1632, 1634, 1636. Also, nodes C1 and C2 are networked based on same frequency (1 GHz) and same modulation frequency modulation (FM). Node A5 1610 may attempt to join the network of A1-A4 using like frequency and phase 1612. Node B1 1622 may be a link between two networks by indicating an ability to change frequencies and phase from 950 MHz DQPSK 1636 to 800 MHz GMSK 1612.

Green events 1680 may comprise a majority of events from time T0 to T5. Blue events 1660 and red events 1670 may comprise shorter periods T1-T2 and T3-T4 respectively.

Method 100 may follow a logical progression as it receives, analyzes, and classifies each perceived entity. For example, method 100 may sense RF emissions from all the nodes and detect all of the RF signals. Then method 100 may classify the waveforms of each node and estimate the center frequency, power, and bandwidth for each. Method 100 may also identify specific node ID for each of the nodes. All these measured level 1 and level 2 parameters are made available to the level 3 clustering algorithm for analysis.

Figure 17:
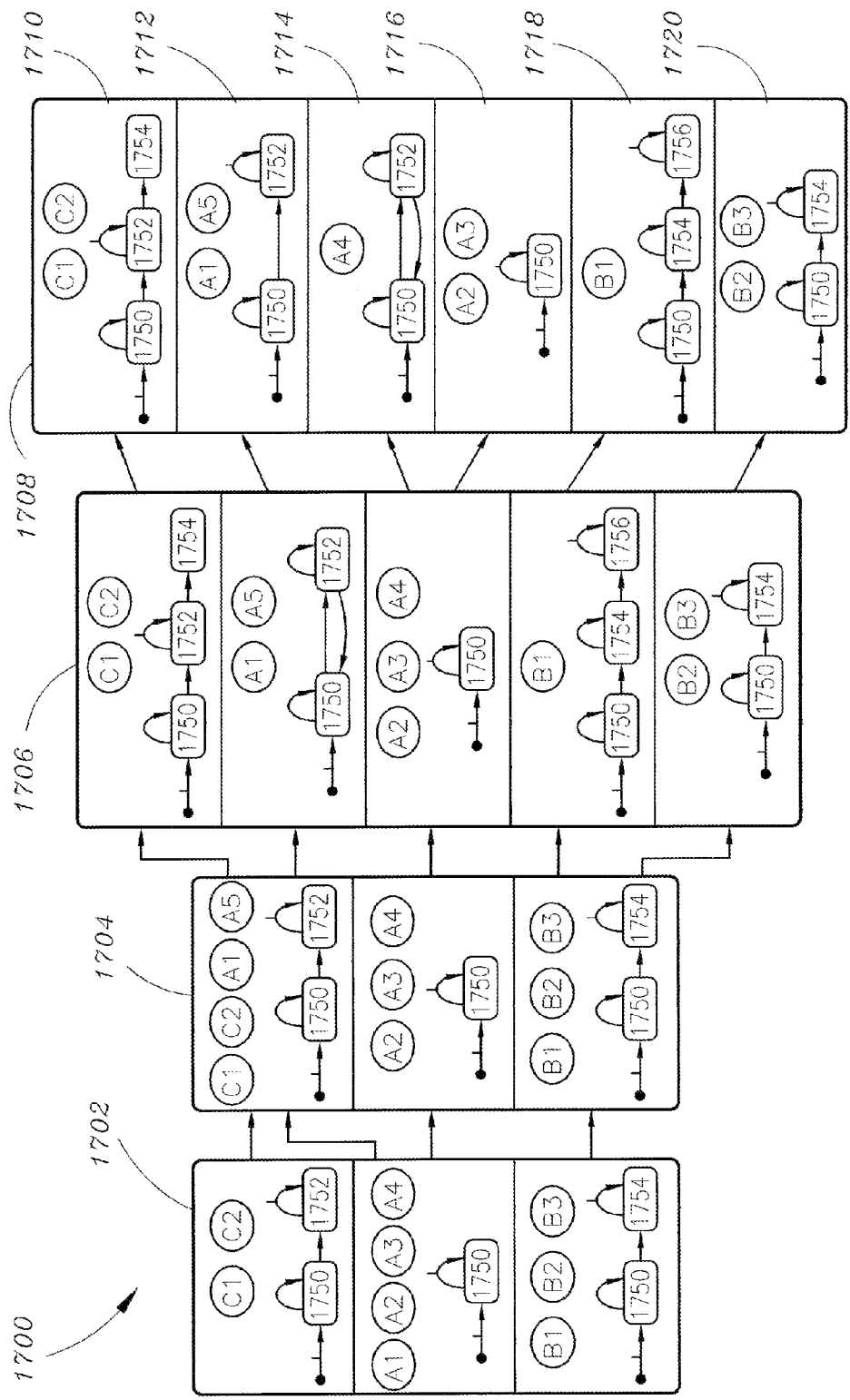
FIG. 17 is a diagram of time evolution of models and associated nodes in accordance with a preferred embodiment of the present invention.

Referring to FIG. 17, a diagram of time evolution of models and associated nodes in accordance with a preferred embodiment of the present invention is shown. Each evolution step follows the path from 1702 to 1704 to 1706, and 1708. Each evolution step may depend on the characteristics received from each of the nodes. As before, the example nodes are A1-A4, B1-B3 and C1-C2. Example 1700 characteristics received may include: Command Chain, Frequency hopping, and waveform change. For example, characteristic 1750 may indicate a Command-Chain-Chaotic, Frequency Hopping Infrequent, and Waveform Change Normal. Characteristic 1752 may indicate a Command Chain Bi-Directional, Frequency Hopping Infrequent, and Waveform Change Normal. Characteristic 1754 may indicate a Command Chain Hierarchical, Frequency Hopping Infrequent, and Waveform Change Normal. Finally, Characteristic 1756 may indicate a Command Chain Hierarchical, Frequency Hopping Infrequent, and Waveform Change Infrequent.

Following an exemplary path of node A2 through the evolution steps finds a final position of node A2 at state 1716.

Each of the end states may indicate a likely classification of the perceived entity. For example, 1710 and 1712 may indicate a hostile enemy, while 1714 may indicate only an enemy. 1716 may indicate a neutral entity while 1718 and 1720 may indicate a friendly entity.

Figure 18A:
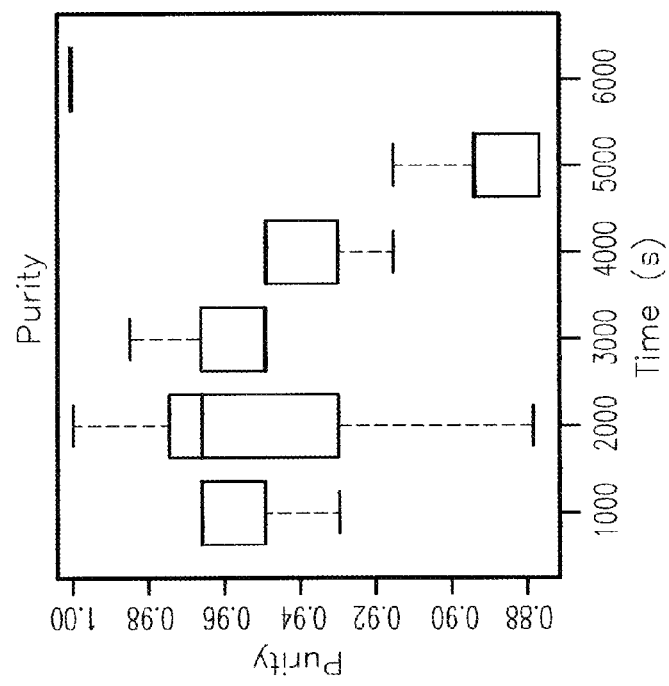
FIGS. 18a and 18b are graphs of purity and number of models of scenario results for Markov Chain Alternative Clustering associated with time, exemplary of a preferred embodiment of the present invention.
Figure 18B:
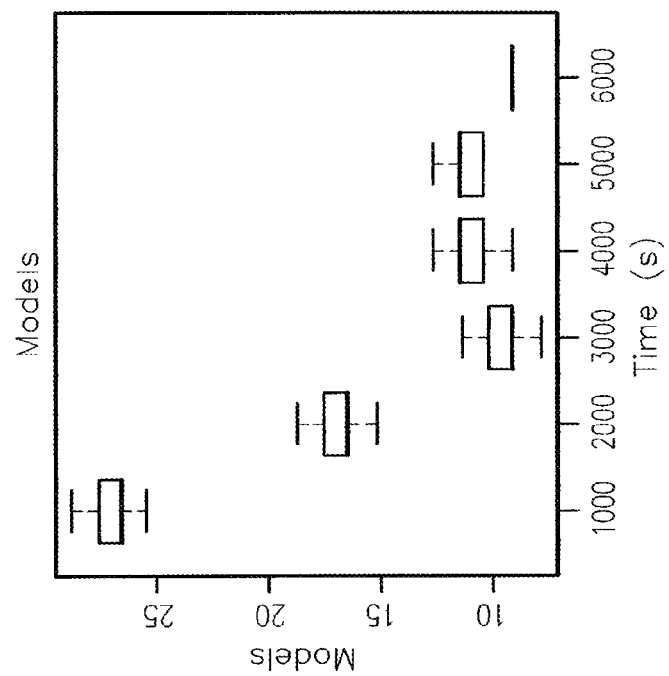

Referring to FIGS. 18a and 18b, graphs of purity and number of models of scenario results for Markov Chain Alternative Clustering associated with time, exemplary of a preferred embodiment of the present invention is shown. FIG. 18a indicates how the purity evolves across the simulation for the preferred Markov Alternative Clustering algorithm. In general the purity is above 88% and at the end, the purity reaches 100%. FIG. 18b shows how the number of models evolves across the simulation. At the beginning the number of models is very high (more than 25 models), but then it decreases, stabilizing around 10 models.

Figure 19:
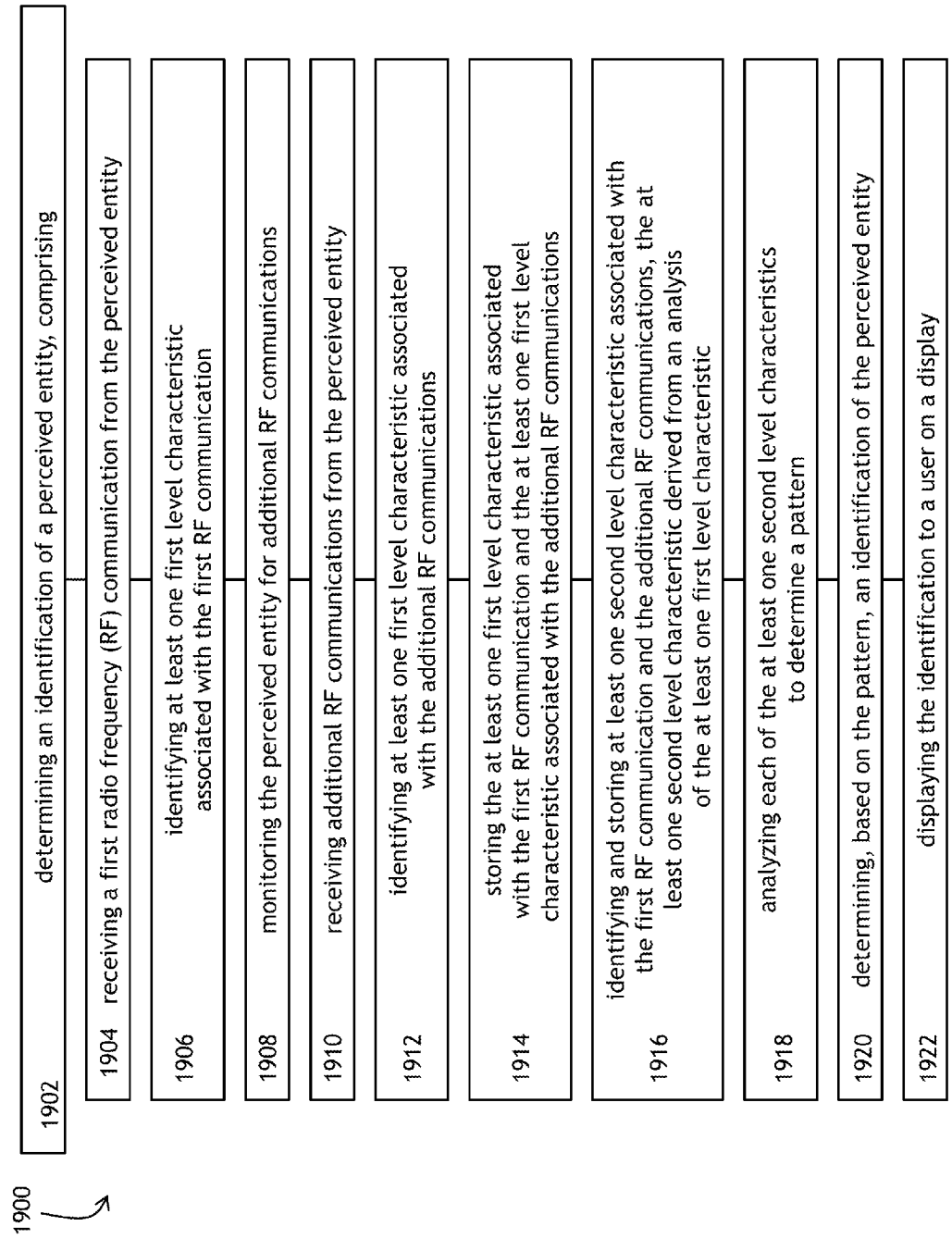
FIG. 19 is a block diagram of the method of Markov Chain Alternative Clustering representative of a preferred embodiment of the present invention.

Referring to FIG. 19, a block diagram of the method of Markov Chain Alternative Clustering representative of a preferred embodiment of the present invention is shown. Method 1900 may, at step 1902, determine an identification of a perceived entity, the method comprising: at step 1904, receiving a first radio frequency (RF) communication from the perceived entity. At step 1906 method 1900 may identify at least one first level characteristic associated with the first RF communication, at step 1908, monitoring the perceived entity for additional RF communications, at step 1910, receiving additional RF communications from the perceived entity. Method 1900 may continue at step 1912, identifying at least one first level characteristic associated with the additional RF communications, step 1914, storing the at least one first level characteristic associated with the first RF communication and the at least one first level characteristic associated with the additional RF communications, step 1916, identifying and storing at least one second level characteristic associated with the first RF communication and the additional RF communications, the at least one second level characteristic derived from an analysis of the at least one first level characteristic. Method 1900 concludes with step 1918, analyzing each of the at least one second level characteristics to determine a pattern, step 1920, determining, based on the pattern, an identification of the perceived entity, and step 1922, displaying the identification to a user on a display.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for determining an identification of a perceived entity, the method comprising:
 receiving a first radio frequency (RF) communication from said perceived entity;
 identifying a first instance of at least one first level characteristic associated with said first RF communication;
 monitoring said perceived entity for additional RF communications;
 receiving additional RF communications from said perceived entity;
 identifying a second instance of at least one first level characteristic associated with said additional RF communications;
 storing said at least one first level characteristic associated with said first RF communication and said at least one first level characteristic associated with said additional RF communications;
 identifying and storing at least one second level characteristic associated with said first RF communication and said additional RF communications, said at least one second level characteristic derived from an analysis of said first instance of at least one first level characteristic and said second instance at least one first level characteristic;
 analyzing each of said at least one second level characteristics to determine a signal pattern;
 determining an identification of said perceived entity based on said signal pattern, said identification of said perceived entity either of: a friend or a foe or a neutral; and
 displaying said identification to a user on a display.

2. The method of claim 1, wherein said at least one first level characteristic comprises at least one of: a Time of reception, a Node ID, a Position, a vectorial Velocity, a Voice ID, a Waveform, a Frequency, a Bandwidth, and a Transmission Power Range.

3. The method of claim 1, wherein said at least one second level characteristic comprises at least one of: a Command Chain, a Frequency Hopping Pattern, a Mobility Change Pattern, a Traffic/Mobility Correlation, a Transmission Power Utilization Pattern, a Voice-ID Change Pattern, and a Waveform Change Pattern.

4. The method of claim 1, wherein said determining an identification of said perceived entity based on said signal pattern further comprises an analysis based on a Markov Chain alternative clustering analysis.

5. The method of claim 1, wherein said receiving a first RF communication from said perceived entity further comprises reception via at least one of: a subsurface receiver, a surface based receiver, an airborne receiver, and a space based receiver.

6. The method of claim 1, wherein said displaying said identification to a user on a display further comprises configuring said identification for further transmission.

7. The method of claim 1, wherein said analysis of said first instance of at least one first level characteristic and said second instance of at least one first level characteristic changes based on a changed additional RF communications transmitted from said perceived entity.

8. A system for identifying a perceived entity, the system comprising:
 a receiver configured for receiving a first RF communication and additional RF communications, said receiver further configured for receiving at least one first level characteristic from each of said RF communications;

a Cognitive Network Electronic Warfare (CNEW) controller configured for directing inner system network communication, directing organization, and for directing mission management;

a processor configured for analysis of said at least one first level characteristic from each of said RF communications, said processor further configured for determining at least one second level characteristic of said RF communications based on the analysis;

a user interface in data communication with said CNEW controller, said user interface configured to display information to, and receive information from, a user;

a data storage in data communication with said receiver, said controller, and said processor;

wherein said processor is configured to further analyze said at least one first level characteristic from each of said RF communications and said at least one second level characteristic of said RF communications to determine a signal pattern and deliver to said user an identification and classification of said perceived entity based on said further analysis and said signal pattern, said identification of said perceived entity either of: a friend or a foe or a neutral.

9. The system of claim 8, wherein said at least one first level characteristic comprises at least one of: a Time of reception, a Node ID, a Position, a vectorial Velocity, a Voice ID, a Waveform, a Frequency, a Bandwidth, and a Transmission Power Range.

10. The method of claim 8, wherein said at least one second level characteristic comprises at least one of: a Command Chain, a Frequency Hopping Pattern, a Mobility Change Pattern, a Traffic/Mobility Correlation, a Transmission Power Utilization Pattern, a Voice-ID Change Pattern, and a Waveform Change Pattern.

11. The method of claim 8, wherein said receiver configured for receiving RF communications further comprises reception via at least one of: a subsurface receiver, a surface based receiver, an airborne receiver, and a space based receiver.

12. The method of claim 8, wherein said analysis of said at least one first level characteristic from each of said RF communications and said at least one second level characteristic of said RF communications changes based on a changed additional RF communications transmitted from said perceived entity.

13. The method of claim 8, wherein said analysis of said at least one first level characteristic from each of said RF communications and said at least one second level characteristic of said RF communications further comprises an analysis based on a Markov Chain alternative clustering analysis.

14. The method of claim 8, wherein said processor is further configured to change the analysis of said at least one first level characteristic based on a changed first RF communication transmitted from said perceived entity, wherein said processor is further configured to continuously monitor said RF communications, and wherein said processor is further configured to determine and deliver to said user a re-identification and a re-classification of said perceived entity based on analysis resulting from said continuous monitoring.

15. A computer readable medium having non-transitory computer readable program code embodied therein which, when executed on a computer device or processor, performs the steps of:

receiving a first radio frequency (RF) communication from said perceived entity;

identifying a first instance of at least one first level characteristic associated with said first RF communication;

monitoring said perceived entity for additional RF communications;

receiving additional RF communications from said perceived entity;

identifying a second instance of at least one first level characteristic associated with said additional RF communications;

storing said at least one first level characteristic associated with said first RF communication and said at least one first level characteristic associated with said additional RF communications;

identifying and storing at least one second level characteristic associated with said first RF communication and said additional RF communications, said at least one second level characteristic derived from an analysis of said first instance of at least one first level characteristic and said second instance of at least one first level characteristic;

analyzing each of said at least one second level characteristics to determine a signal pattern;

determining an identification of said perceived entity based on said signal pattern, said identification of said perceived entity either of: a friend or a foe or a neutral; and displaying said identification to a user on a display.

16. The computer readable medium of claim 15, wherein said at least one first level characteristic comprise at least one of: a Time of reception, a Node ID, a Position, a vectorial Velocity, a Voice ID, a Waveform, a Frequency, a Bandwidth, and a Transmission Power Range.

17. The computer readable medium of claim 15, wherein said at least one second level characteristic comprises at least one of: a Command Chain, a Frequency Hopping Pattern, a Mobility Change Pattern, a Traffic/Mobility Correlation, a Transmission Power Utilization Pattern, a Voice-ID Change Pattern, and a Waveform Change Pattern.

18. The computer readable medium of claim 15, wherein said determining an identification of said perceived entity based on said signal pattern further comprises an analysis based on a Markov Chain alternative clustering analysis.

19. The computer readable medium of claim 15, wherein said receiving a first RF communication from said perceived entity further comprises reception via at least one of: a subsurface receiver, a surface based receiver, an airborne receiver, and a space based receiver.

20. The computer readable medium of claim 15, wherein said displaying said identification to a user on a display further comprises configuring said identification for further transmission.

* * * * *